US009427737B2

(12) United States Patent
Heredia et al.

(10) Patent No.: US 9,427,737 B2
(45) Date of Patent: Aug. 30, 2016

(54) METHODS AND COMPOSITIONS FOR USING OILS FOR ANALYSIS AND DETECTION OF MOLECULES

(71) Applicant: Bio-Rad Laboratories, Inc., Hercules, CA (US)

(72) Inventors: Nicholas Jack Heredia, Mountain House, CA (US); Anthony J. Makarewicz, Jr., Livermore, CA (US)

(73) Assignee: Bio-Rad Laboratories, Inc., Hercules, CA (US)

(*) Notice: Subject to any disclaimer, the term of this patent is extended or adjusted under 35 U.S.C. 154(b) by 56 days.

(21) Appl. No.: 14/105,009

(22) Filed: Dec. 12, 2013

(65) Prior Publication Data
US 2014/0170736 A1 Jun. 19, 2014

Related U.S. Application Data

(60) Provisional application No. 61/737,698, filed on Dec. 14, 2012.

(51) Int. Cl.
*B01L 3/00* (2006.01)
*C08L 83/04* (2006.01)
*B01L 7/00* (2006.01)

(52) U.S. Cl.
CPC .......... *B01L 3/502784* (2013.01); *C08L 83/04* (2013.01); *B01L 3/502707* (2013.01); *B01L 3/502776* (2013.01); *B01L 7/52* (2013.01); *B01L 2200/0673* (2013.01)

(58) Field of Classification Search
None
See application file for complete search history.

(56) References Cited

U.S. PATENT DOCUMENTS

| | | | |
|---|---|---|---|
| 5,210,015 A | 5/1993 | Gelfand et al. | |
| 5,336,487 A * | 8/1994 | Refojo | A61K 31/695 424/78.04 |
| 6,331,393 B1 | 12/2001 | Laird et al. | |
| 6,352,651 B1 | 3/2002 | Endo et al. | |
| 6,780,402 B1 | 8/2004 | Agostini et al. | |
| 7,041,481 B2 | 5/2006 | Anderson et al. | |
| 7,048,481 B2 | 5/2006 | Sugata et al. | |
| 7,745,122 B2 | 6/2010 | Lao et al. | |
| 7,816,121 B2 | 10/2010 | Pollack et al. | |
| 2007/0242105 A1* | 10/2007 | Srinivasan et al. | 347/63 |
| 2008/0262103 A1* | 10/2008 | Stork et al. | 514/772.6 |
| 2009/0053312 A1* | 2/2009 | Berndt | A61K 8/042 424/484 |
| 2009/0117286 A1* | 5/2009 | Ishikawa | 427/511 |
| 2010/0022414 A1 | 1/2010 | Link et al. | |
| 2010/0105112 A1 | 4/2010 | Holtze et al. | |
| 2010/0173394 A1 | 7/2010 | Colston et al. | |
| 2011/0053798 A1 | 3/2011 | Hindson et al. | |
| 2011/0086354 A1 | 4/2011 | Tzubery et al. | |
| 2011/0092376 A1 | 4/2011 | Colston, Jr. et al. | |
| 2011/0159499 A1 | 6/2011 | Hindson et al. | |
| 2011/0217711 A1 | 9/2011 | Hiddessen et al. | |
| 2011/0217712 A1 | 9/2011 | Hiddessen et al. | |
| 2011/0217736 A1 | 9/2011 | Hindson | |
| 2011/0311978 A1 | 12/2011 | Makarewicz, Jr. et al. | |
| 2012/0252015 A1 | 10/2012 | Hindson et al. | |
| 2012/0322058 A1 | 12/2012 | Regan et al. | |
| 2014/0356289 A1* | 12/2014 | Bayley et al. | 424/9.1 |

FOREIGN PATENT DOCUMENTS

| | | |
|---|---|---|
| EP | 1114635 B1 * | 6/2004 |
| WO | WO 2011/120006 A1 | 9/2011 |
| WO | WO 2011/120020 A1 | 9/2011 |

OTHER PUBLICATIONS

Kuo (Poly(dimethylsiloxane), Ch. 89, pp. 411-435, James E. Mark Ed., in Polymer Data Handbook (Oxford Univ. Press) Nov. 5, 2009).*
Liu et al. (Preparation and Applications of Silicone Emulsions Using Biopolymers, Chapter 11, pp. 309-328 in Elaissari, Ed., Colloidal Biomolecules, Biomaterials, and Biomedical Applications (CRC Press), Oct. 21, 2003).*
Holtze et al. (Biocompatible surfactants for water-in fluorocarbon emulsions, Lab Chip, 2008, 8, 1632-1639, First published online Sep. 2, 2008).*
Ohashi et al. (A simple device using magnetic transportation for droplet-based PCR, Biomed Microdevices. Oct. 2007;9(5):695-702).*
Baret. Surfactants in droplet-based microfluidics. Lab Chip. Feb. 7, 2012;12(3):422-33. doi: 10.1039/c11c20582j. Epub Oct. 20, 2011.
Begolo, et al. New family of fluorinated polymer chips for droplet and organic solvent microfluidics. Lab Chip. Feb. 7, 2011;11(3):508-12. doi: 10.1039/c01c00356e. Epub Nov. 26, 2010.
Brassard, et al. Water-oil core-shell droplets for electrowetting-based digital microfluidic devices. Lab Chip. Aug. 2008;8(8):1342-9. doi: 10.1039/b803827a. Epub Jul. 1, 2008.
Hardt, et al. Microfluidics with aqueous two-phase systems. Lab Chip. Feb. 7, 2012;12(3):434-42. doi: 10.1039/c11c20569b. Epub Sep. 7, 2011.
International search report and written opinion dated Mar. 13, 2014 for PCT/US2013/074821.
Niu, et al. Building droplet-based microfluidic systems for biological analysis. Biochem Soc Trans. Aug. 2012;40(4):615-23. doi: 10.1042/BST20120005.
Biorad. A Breakthrough in Quantitative PCR from QuantaLife. Information brochure. 2012.
Brouzes, et al. Droplet microfluidic technology for single-cell high-throughput screening Proc Natl Acad Sci U S A. Aug. 25, 2009;106(34):14195-200.
Chang, et al. Integrated polymerase chain reaction chips utilizing digital microfluidics. Biomed Microdevices. Sep. 2006;8(3):215-25.
Hindson, et al. High-throughput droplet digital PCR system for absolute quantitation of DNA copy number. Anal Chem. Nov. 15, 2011;83(22):8604-10. Epub Oct. 28, 2011.

(Continued)

*Primary Examiner* — Aaron Priest
(74) *Attorney, Agent, or Firm* — Kolisch Hartwell, P.C.

(57) ABSTRACT

Oil compositions and methods for use in droplet formation or in spacing of droplets are disclosed. The oil compositions may include a combination, such as a silicone oil and a fluorine-containing compound. The droplets can contain analytes (e.g., nucleic acids) and may be used for molecular reactions (e.g., digital PCR) and detection.

19 Claims, 8 Drawing Sheets

(56) References Cited

OTHER PUBLICATIONS

Huebner, et al. Microdroplets: a sea of applications? Lab Chip. Aug. 2008;8(8):1244-54. Epub Jun. 24, 2008.
Nakamura, et al. Analysis and fractionation of silicone and fluoro silicone oils for intraocular use. Invest Ophthalmol Vis Sci. Oct. 1990;31(10):2059-69.
Nolte. Branched DNA signal amplification for direct quantitation of nucleic acid sequences in clinical specimens. Adv Clin Chem. 1998;33:201-35.
QuantaLife Presentation: Droplet generator & Droplet Reader Overview. Oct. 25, 2010.
Tseng. Microdroplet Generators. Chapter 30. 2002 by CRC Press LLC.
Wang, et al. Controllable microfluidic production of multicomponent multiple emulsions. Lab Chip. May 7, 2011;11(9):1587-92. Epub Apr. 1, 2011.
Zhang, et al. Single-molecule DNA amplification and analysis using microfluidics. Chem Rev. Aug. 11, 2010;110(8):4910-47.
Zhu, et al. Hydroxyl terminated silicone oil as co-stabilizer for miniemulsion copolymerization of acrylate and methacryloxy(propyl)-trimethoxysilane. www.chemistrymag.com/cji/2005/07c084ne.htm Dec 16, 2005. 17; 12:84.

* cited by examiner

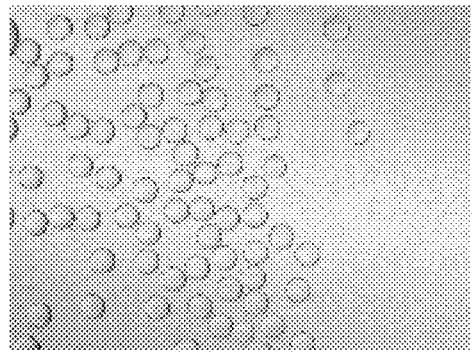
Fig. 4a
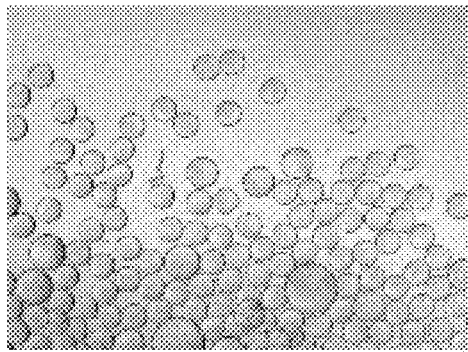
Fig. 4b
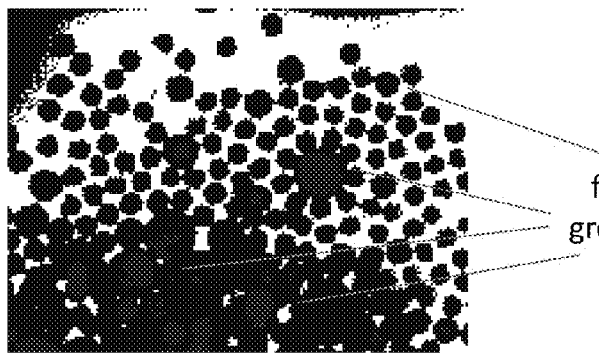
Fig. 4c
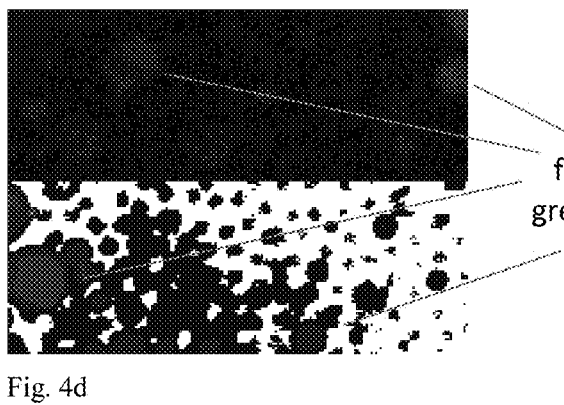
Fig. 4d
FIG. 4

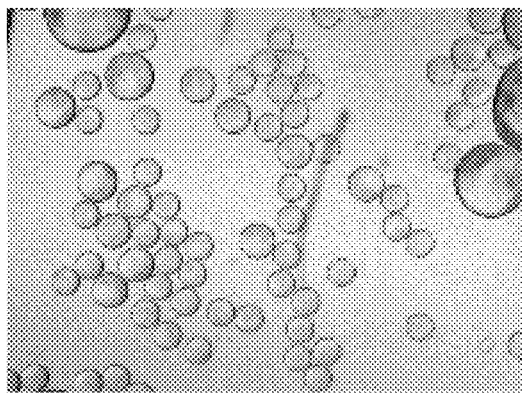
Fig. 4e
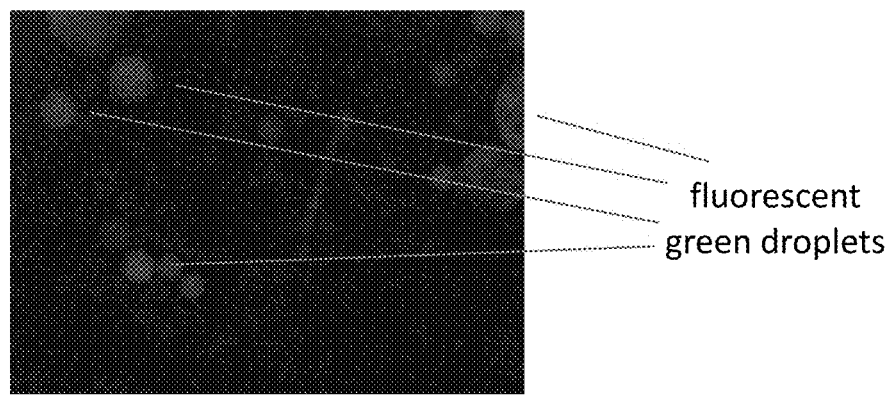
Fig. 4f
FIG. 4 (continued)

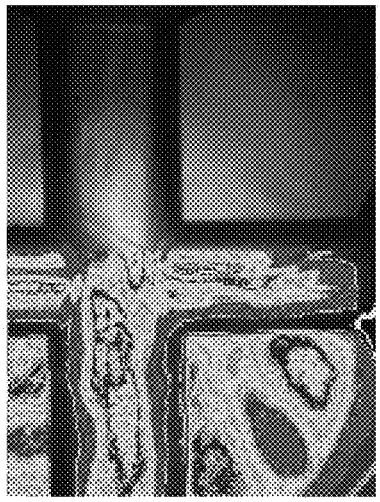
Fig. 6a
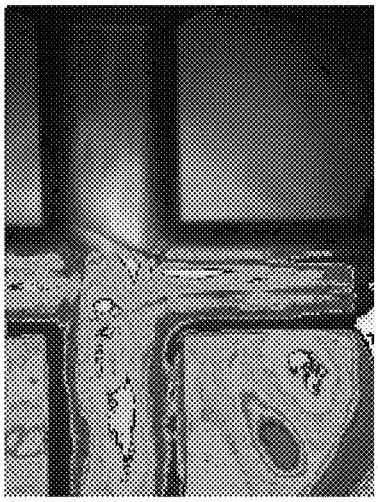
Fig. 6b
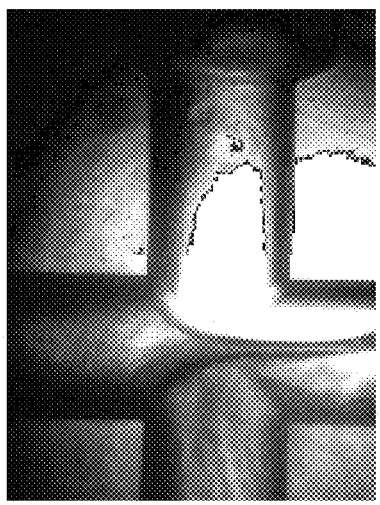
Fig. 6c
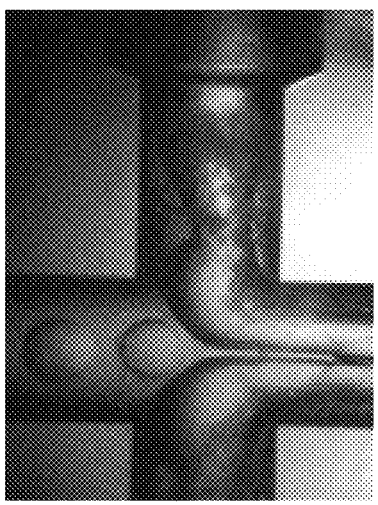
Fig. 6d
FIG. 6

METHODS AND COMPOSITIONS FOR USING OILS FOR ANALYSIS AND DETECTION OF MOLECULES

CROSS-REFERENCE

This application claims the benefit of U.S. Provisional Patent Application Ser. No. 61/737,698, filed Dec. 14, 2012, which is incorporated herein by reference in its entirety.

BACKGROUND

Detection and quantification of nucleic acids using PCR can be useful for a large number of biological and clinical applications. The first generation of PCR users performed end-point analysis by gel electrophoresis to obtain qualitative results. The advent of real-time PCR (which can involve monitoring the progression of amplification using fluorescence probes) permitted quantification of nucleic acids in some settings. Quantitative information can be obtained from the cycle threshold ($C_T$), a point on the analogue fluorescence curve where the signal increases above background. Real-time PCR can involve the use of external calibrators or normalization to endogenous controls.

In digital PCR, a sample containing PCR reagents and target nucleic acid molecules can be distributed across multiple replicate partitions, often such that each individual partition contains on average less than one target nucleic acid molecule. After amplification, reactions containing one or more templates can be detectable and can emit a signal such as a fluorescent signal.

In some cases, digital PCR can be accomplished by a technique called droplet digital PCR. The operations for droplet digital PCR can involve (1) partitioning a fluid sample containing PCR reagents and nucleic acid target molecule(s) into multiple droplets, (2) performing an amplification cycle on the droplets, and (3) detecting the presence of nucleic acids in the droplets. A nucleic acid sample can be partitioned into multiple droplets using oil and emulsion chemistry. For example, an aqueous sample can be partitioned into multiple emulsified droplets in a continuous oil phase using microfluidics technologies.

SUMMARY

In an aspect, the present disclosure provides an oil composition comprising a silicone oil and a fluorine-containing compound, where the silicone oil and the fluorine-containing compound are within a homogeneous mixture. The oil composition may further comprise polyethylene glycol.

The oil composition may have a viscosity of at least about 1, at least about 2, at least about 3, at least about 4, at least about 5, at least about 6, at least about 7, at least about 8, at least about 9, or at least about 10 cS. In some embodiments, the silicone oil comprises a polydimethylsiloxane. The polydimethylsiloxane may have a mean molecular weight ($M_w$) of at least about 1,000 g/mol. The silicone oil may have a viscosity of at least about 1 cS. In some other embodiments, the silicone oil comprises cyclopentasiloxane or octamethyltrisiloxane. The fluorine-containing compound may comprise fluorine-substituted alkylsiloxane. In some embodiments, the fluorine-containing compound is polymethyl-(3,3,3-trifluropropyl)siloxane, a fluoroalcohol, or a fluorocarbon.

In an aspect, the disclosure provides an oil composition comprising (a) a silicone oil; and (b) a fluorine-containing compound, wherein i) the concentration of said silicone oil is at least about 50% by weight, or ii) the concentration of said fluorine-containing compound is at most about 50% by weight, and wherein the silicone oil and the fluorine-containing compound are within a homogeneous mixture.

In another aspect, the disclosure provides a method of droplet generation, comprising contacting a homogenous mixture with an aqueous phase thereby generating a composition comprising a plurality of emulsified droplets within a continuous phase, wherein the homogenous mixture comprises a silicone oil and a fluorine-containing compound, wherein i) the concentration of said silicone oil is at least about 50% by weight, or ii) the concentration of said fluorine-containing compound is at most about 50% by weight.

In another aspect, the disclosure provides a system for analyzing a sample, comprising (a) an emulsion comprising a plurality of droplets within a continuous phase, wherein at least a subset of said plurality of droplets contain a nucleic acid sample or a portion thereof, wherein said continuous phase is a homogenous mixture comprising a silicone oil and a fluorine-containing compound, wherein i) the concentration of said silicone oil is at least about 50% by weight, or ii) the concentration of said fluorine-containing compound is at most about 50% by weight; (b) a droplet transporter configured to drive flow of the droplets in a spacer fluid through a region comprising a tube equipped with at least two inlets; (c) a detector configured to collect data related to amplification of one or more nucleic acid targets from individual droplets as such individual droplets travel through the detection region; and (d) a controller programmed to determine, based on the data collected, whether the nucleic acid target is present or absent in individual droplets. In some embodiments, the spacer fluid is a silicone oil.

In another aspect, the disclosure provides an oil composition comprising (a) a mixture comprising a first silicone oil, a fluorine-containing compound, and water; and (b) a second silicone oil, wherein the difference in density between the mixture and the second silicone oil is at least about 0.01 g/mL.

In another aspect, the disclosure provides an oil composition comprising (a) a mixture comprising a first silicone oil, a fluorine-containing compound, and water; and (b) a second silicone oil, wherein the difference in viscosity between the mixture and the second silicone oil is at least about 1 cS.

In some cases, the amount of silicone oil is at least 50% by weight. In a further embodiment, the amount of silicone oil is at least 65% by weight. In some other cases, the amount of fluorine-containing compound is at least 50% by weight. In a further embodiment, the amount of fluorine-containing compound is at least 30% by weight.

The oil composition may further comprise a surfactant. The surfactant may be a fluorine-containing compound, a polyol or silica. The fluorine-containing surfactant may be a perfluoropolyether. The silica may be fumed silica. The polyol may be polyethylene glycol. The amount of surfactant may be at most about 1% of by weight of the oil composition.

The oil composition may exist in the form of an emulsion. The emulsion may comprise droplets. In some embodiments, the droplets vary in size by a standard deviation of the volume (or diameter) that is less than about 10% of the average droplet volume.

The oil composition may have a density of at least about 0.1, at least about 0.2, at least about 0.3, at least about 0.4, at least about 0.5, at least about 0.6, or at least about 0.7 g/mL. In some embodiments, the oil composition has a density of about 0.1, about 0.2, about 0.3, about 0.4, about 0.5, about 0.6, or about 0.7 g/mL The oil composition may further comprise a Taq polymerase. The Taq polymerase may allow an amplification reaction takes place within the oil composition.

The oil composition may be chemically unreactive toward an intercalating dye at a temperature range of about 4 to about 100° C. In some embodiments, the intercalating dye is Sybr green.

In another aspect, the present disclosure provides a method of droplet generation, comprising contacting the oil composition as described herein with an aqueous phase, thereby generating a composition comprising a plurality of emulsified droplets within a continuous phase.

In some embodiments, the continuous phase comprises the oil composition as described herein. In some other embodiments, the core of the emulsified droplets comprises the oil composition as described herein. In some other embodiments, the emulsified droplets are encapsulated by the oil composition as described herein.

The continuous phase may comprise a silicone oil. The aqueous phase may comprise a surfactant. The surfactant may be tetraethyl ammonium bromide. Furthermore, the droplets may comprise a sample configured for PCR amplification, such as a nucleic acid, master mix, an intercalating dye or a DNA polymerase. One example of the intercalating dye is Sybr green. The intercalating dye may remain in the droplets for at least about five days at a temperature range of about 4 to about 37° C. In some embodiments, at least about 80%, at least about 85%, at least about 90%, or at least about 9% of the intercalating dye remains in the droplets for at least about five days at a temperature range of about 4 to about 37° C. In some other embodiments, the continuous phase comprises at most about 0.0001 M of the intercalating dye when the mixture of the plurality of droplets and the continuous phase is held at a temperature range of about 4 to about 37° C. for at least about 5 days. The droplets have a thermal conductivity of at least about 0.01 W/(mK). The droplets may exhibit enhanced stability due to the addition of surfactant. In some embodiments, the droplets do not coalesce over a time period of about 12 to about 24 hours. In addition, oxygen content within the droplets may be modulated by changing the weight ratio of silicone oil and fluorine-containing compound.

The droplets may be generated with a device comprising a capillary tube. One example of the capillary tube is a glass capillary tube. The method may further comprise thermally cycling the plurality of droplets so as to induce nucleic acid amplification.

In another aspect, the present disclosure provides a system for analyzing a sample, comprising: a plurality of droplets prepared by the method as described herein, where a nucleic acid in the droplets undergoes PCR amplification; a spacer fluid; a droplet transporter configured to drive flow of the droplets through a region comprising a tube equipped with at least two inlets; a detector configured to collect data related to amplification of one or more nucleic acid targets from individual droplets as such individual droplets travel through the detection region; and a controller programmed to determine, based on the data collected, whether the nucleic acid target is present or absent in individual droplets.

The spacer fluid may be a silicone oil. The difference in density between the spacer fluid and the plurality of droplets may be at least about 0.05 g/mL. The difference in viscosity between the spacer fluid and the plurality of droplets may be at least about 1, at least about 2, at least about 3, at least about 4, or at least about 5 cS. The distance between the two nearest droplets may be at most about 100,000, at most about 200,000, at most about 300,000, at most about 400,000, at most about 500,000, at most about 600,000, at most about 700,000, or at most about 800,000 μm. The detector may be a fluorescence detector.

In another aspect, the present disclosure provides an oil composition comprising: a mixture comprising a first silicone oil, a fluorine-containing compound, and water; and a second silicone oil. In some embodiments, the difference in density between the mixture and the second silicone oil is at least about 0.01, at least about 0.02, at least about 0.03, at least about 0.04, at least about 0.05, at least about 0.06, at least about 0.07, at least about 0.08, at least about 0.10, at least about 0.2, or at least about 0.3 g/mL. In some other embodiments, the difference in viscosity between the mixture and the second silicone oil is at least about 0.5, at least about 1, at least about 2, at least about 3, at least about 4, at least about 5 cS. The second silicone oil may have a viscosity of at least about 1, at least about 2, at least about 3, at least about 4, at least about 5, at least about 10, at least about 20, at least about 30, or at least about 40 cS. In addition, the second silicone oil may have a mean molecular weight ($M_w$) of at least about 900, at least about 1,000, at least about 1,100, at least about 1,500, at least about 2,000, at least about 5,000, or at least about 10,000 g/mol. In some embodiments, the second silicone oil is substantially free of surfactant. In some other embodiments, the second silicone oil comprises a surfactant. In addition, the water may comprise a sample configured for PCR amplification.

Additional aspects and advantages of the present disclosure will become readily apparent to those skilled in this art from the following detailed description, where only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference in their entireties, and to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also referred to as "Figures" or "FIGS.") of which:

FIG. 4 illustrates the stability of the Sybr green intercalating dye in the droplets, in accordance with an embodiment of the invention; FIG. 4a shows a bright-field image of droplets comprising Sybr green before PCR; FIG. 4b shows a bright-field image of droplets comprising Sybr green within a day of PCR having been performed on the droplets; FIGS. 4c and 4d show florescent images of Sybr green in the droplets within a day of PCR having been performed on the droplets; FIG. 4e shows a bright-field image shows droplets comprising Sybr green 4 days after PCR has been performed on the droplets; FIG. 4f shows a fluorescent image of Sybr green in the droplets 4 days after PCR has been performed on the droplets;

FIG. 6 illustrates the streamlining and focusing of oil compositions and droplets that comprise them by a spacer fluid, in accordance with an embodiment of the invention; FIGS. 6a-6c illustrate the streamlining and focusing of oil compositions by spacer fluid over time, with FIG. 6a showing the initial contact of oil composition with spacer fluid, FIG. 6b depicting the early stages in the formation of streamlines, and FIG. 6c illustrating the final sharp streamline of an oil composition within a spacer fluid. FIG. 6d shows droplets comprising an oil composition and water flowing toward the intersection of the tube with the spacer oil inlet, forming a streamline when the droplets come into contact with the spacer fluid.

DETAILED DESCRIPTION

Figure 1:
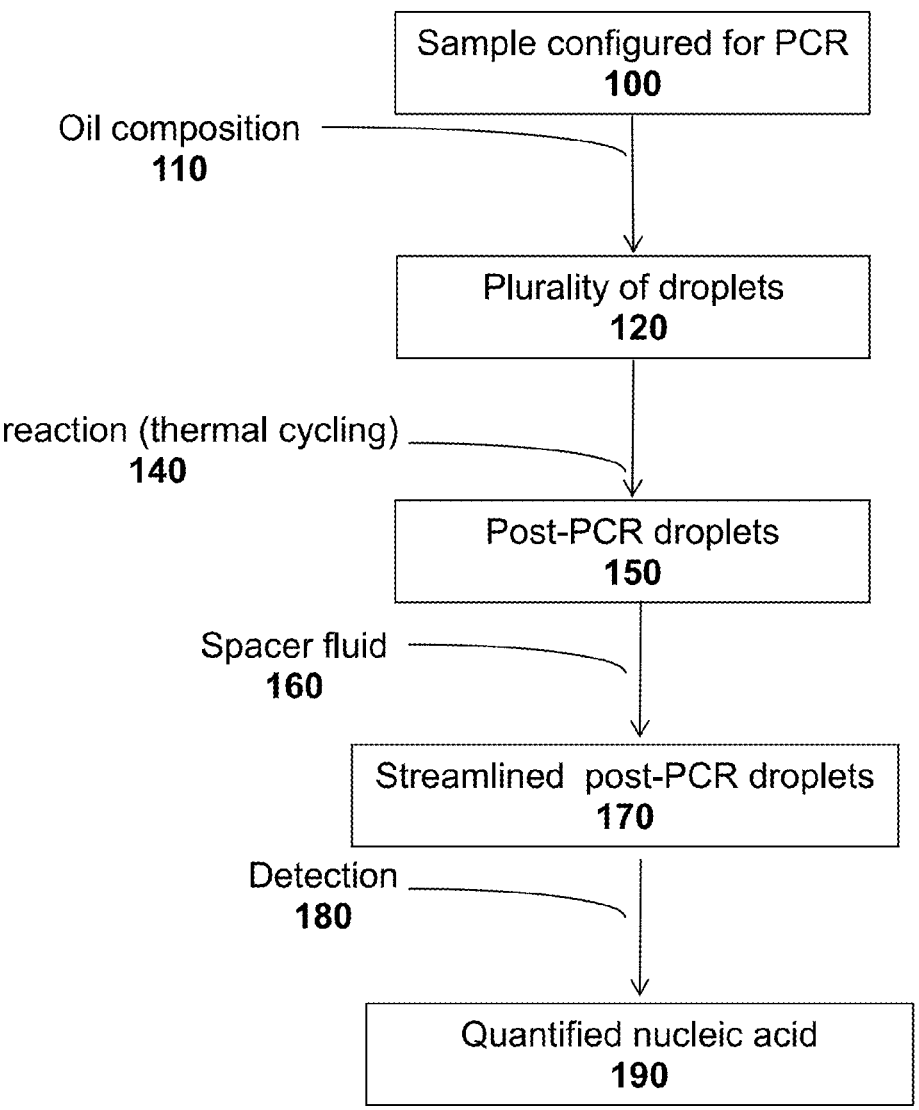
FIG. 1 schematically illustrates the workflow of droplet digital PCR, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" as used herein refers to a range that is 15% plus or minus from a stated numerical value within the context of the particular usage. For example, about 10 can include a range from 8.5 to 11.5.

The present disclosure provides compositions and methods for use in droplet digital PCR (ddPCR), among other applications. Droplets configured for ddPCR applications may be formed when a sample to be analyzed, such as nucleic acids in an aqueous phase, is combined with a non-aqueous phase that is substantially immiscible with the aqueous phase, forming an emulsion. In such cases, the aqueous phase is likely in a dispersed phase in the form of droplets and the non-aqueous phase is the continuous phase. However, in some cases, the droplet is a double emulsion, where the aqueous core is covered by a non-aqueous layer (e.g., oil), that is surrounded by a second aqueous phase in a continuous phase. In further embodiments, the aqueous phase is in the continuous phase and the non-aqueous phase (e.g., oil or other aqueous-immiscible fluid) is in the disperse phase. For example, the nucleic acids may be in a non-aqueous fluid (e.g., oil or other aqueous-immiscible fluid) that is combined with an aqueous fluid to form droplets where the core of the droplets contains the non-aqueous phase (or disperse phase) and the where the aqueous phase is the continuous phase.

In some cases, the non-aqueous phase may include a fluorine-containing compound. The fluorine-containing compound may comprise a non-aqueous phase, which is sometimes called "fluorous phase," that is substantially immiscible with the aqueous phase. The fluorine-containing compounds may form an emulsion with the aqueous phase. In some cases, the aqueous phase is in a disperse phase in the form of droplets and the fluorous phase is in the continuous phase.

In some cases, the non-aqueous phase may include a compound that does not comprise any fluorine atoms. Such a compound can, for example, be a polydimethylsiloxane, herein also "PDMS," such as a linear polydimethylsiloxane $Me_2Si$—O—$(SiMe_2-O)_n$—O—$SiMe_2$, or another compound. In some cases, the non-aqueous phase may include a fluorine-containing compound and a compound that does not comprise any fluorine atoms.

In some cases, the droplets are formed with the use of a droplet generator such as a microfluidic device (e.g., a chip with fluidic channels), a device comprising fluidic capillaries, a piezoelectric actuation device, a pneumatic actuation device, a thermal bubble actuation device, a thermal buckling actuation device, acoustic wave actuation device, an electrostatic actuation device, a device that uses a filter or membrane, or other generators. In some cases, the device comprises glass capillaries.

Although the oil compositions can be useful for forming emulsified droplets, they are also used in other applications. For example, the oil compositions can be used for spacing droplets, which can occur prior to an application (e.g., a detection application).

The compositions disclosed herein include novel combinations of fluorinated and non-fluorinated compounds for use in forming droplets suitable for ddPCR. In particular, the compositions include non-fluorinated silicone oils mixed with fluorine-containing compounds, with the mixtures sometimes further comprising one or more surfactants.

In some cases, the combined fluorine-containing compounds and compounds that do not include any fluorine atoms, according to the present disclosure, form a miscible fluid. In some cases, an emulsion can include an aqueous phase and a non-aqueous phase that comprises one or more fluorine-containing compounds and one or more compounds that do not include any fluorine atoms.

The compositions provided herein may also be used in droplet spacing and/or detection devices. Some nucleic acid spacing and detection systems that form a part of droplet ddPCR workflow are described in U.S. Pat. App. Pub. No. 20110092376 and International Pat. Pub. No. WO2011/120006, and droplet detection systems are further specifically described in U.S. Pat. App. Pub. Nos. 20110311978 and International Pat. Pub. No. WO2011/120020 which are entirely incorporated herein by reference. One component of the droplet detection system may be a singulation fluid, which may function as a spacing or spacer fluid, or focusing fluid, or dilution fluid. Singulation fluid is also described in U.S. Pat. App. Pub. No. 20110217712 which is entirely incorporated herein by reference.

In some embodiments, the singulation fluid allows droplets to flow smoothly through a detecting region, often without significant coalescence between droplets. Singulation fluid may comprise silicone oil, fluorine-containing compounds, or other organic compounds.

The compositions and methods disclosed herein also enable modulating droplet properties for different applications, or for use with different devices, such as devices with different dimensions. For example, the combination oils herein can be adjusted by varying the relative concentrations of the phases in order to achieve a desired property (e.g., buoyancy, density, viscosity, dispersity, stability).

Oil compositions for use in droplet formation described herein may form droplets that remain stable through amplification conditions and/or also may interact favorably with singulation fluids, even though the oil compositions comprise silicone oil and fluorine-containing compounds. The compositions and methods disclosed herein enable significant cost savings associated with cheap and ubiquitous silicone oil.

FIG. 1 schematically illustrates the workflow of ddPCR. A sample containing PCR reagents and target nucleic acid 100, which can sometimes be presented as an aqueous solution, is contacted with oil composition 110, which can be a composition that includes one or more fluorine-containing compounds and one or more compounds that do not contain any fluorine atoms, such as silicone oil. Using droplet generation techniques described elsewhere herein, the sample is partitioned into a plurality of emulsified droplets 120, where the emulsions may comprise an aqueous phase and an oil composition. Emulsified droplets are then subjected to the conditions of a PCR reaction (thermal cycling) 140 such that post-PCR droplets 150, such as droplets containing PCR reagents and target nucleic acid that may have undergone amplification. Post-PCR droplets are then contacted with spacer fluid 160, which may enable the formation of streamlined post-PCR droplets 170. The streamlined post-PCR droplets 170 are then examined using detection 180, which can be fluorescence detection, to determine the amount of quantified nucleic acid 180 in sample containing PCR reagents and target nucleic acid 100.

Oil Compositions

The present disclosure provides oil compositions for use in droplet formation, spacing, buoyancy, and/or detection. Often, an oil composition provided herein is a mixture of oils, or a hybrid of oils. In some cases, the mixture is a homogeneous mixture. In some cases, the oil composition comprises at least about 50% silicone oil by weight. In some cases, the composition comprises at least about 55%, or at least about 60%, or at least about 65%, or at least about 70%, or at least about 75%, or at least about 80%, or at least about 85%, or at least about 90%, or at least about 95%, or at least about 96% or at least about 97% or at least about 98% or at least about 99% silicone oil by weight.

In some cases, the composition comprises at most about 50% fluorine-containing compound, or more than one compound, by weight. In some cases, the oil composition comprises at most about 45%, or at most about 40%, or at most about 35%, or at most about 30%, or at most about 25%, or at most about 20%, or at most about 15%, or at most about 10%, or at most about 5%, or at most about 4%, or at most about 3%, or at most about 2%, or at most about 1% fluorine-containing compound, or more than one compound, by weight.

In some cases, the remainder of the composition comprises one or more compounds that do not include any fluorine atoms. For example, the oil composition can include at most about 45% fluorine-containing compound by weight and at least about 55% by weight of compound that does not include any fluorine atoms. In another example, the oil composition can include at most about 25% fluorine-containing compound by weight and at least about 75% by weight of compound that does not include any fluorine atoms. In yet another example, the oil composition can include at most about 5% fluorine-containing compound by weight and at least about 95% by weight of compound that does not include any fluorine atoms. In further embodiments, the compound or compounds that do not include any fluorine atoms is a silicone oil, such as a composition comprising PDMS, Octamethyltrisiloxane, Octamethyltetrasiloxane, or silicone oil AR-20. In other further embodiments, the fluorine-containing compound is HFE-7500.

In some cases, the oil composition further comprises a surfactant. Surfactant is a surface active substance capable of reducing the surface tension of a liquid in which it is present. A surfactant, which also or alternatively may be described as a detergent and/or wetting agent, may incorporate both a hydrophilic portion and a hydrophobic portion, which may collectively confer a dual hydrophilic-hydrophobic character on the surfactant. A surfactant may, in some cases, be characterized according to its hydrophilicity relative to its hydrophobicity. The oil composition may include at least one nonionic surfactant and/or ionic surfactant. In some embodiments, the aqueous phase may include a surfactant that is a block copolymer of polypropylene oxide and polyethylene oxide.

More particularly, the surfactant may be a block copolymer of polypropylene oxide and polyethylene oxide sold under the trade names PLURONIC® and TETRONIC® (BASF). In some embodiments, the surfactant may be a polyol, such as a nonionic block copolymer of polypropylene oxide and polyethylene oxide sold under the trade name PLURONIC®, such as PLURONIC F-68 or PLURONIC F-127. In some embodiments, the surfactant may be an ionic surfactant such as a quaternary ammonium salt, e.g., methylbenzethonium chloride, cetalkonium chloride, cetylpyridinium chloride, tetraethylammonium bromide, or didecyldimethylammonium chloride. In some embodiments, the surfactant may be an ionic surfactant such as comprising an inorganic cation and an organic anion, such as sodium dodecyl sulfate or sodium lauryl ether sulfate.

Some surfactants according to embodiments of the invention may have the formulae $[R_4N][X]$ or $[R_4P][X]$, where R is an hydrocarbyl group, such as ethyl, methyl, butyl, decyl, phenyl and X is an anion such as a halide, including fluoride, chloride, bromide, or iodide. Two or more R groups may be joined in a ring structure so as to form, for example, a pyridine ring or a phosphinene ring, or another heterocyclic ring, with N or P. Other surfactants according to embodiments of the invention may have the formulae $[A][R]$, where A is a cation such as lithium, sodium, potassium, rubidium or cesium, and R is an anion of an carboxylic, sulfonic, or another organic acid.

In some embodiments, the surfactant may comprise a fluorine-containing compound, such as a surfactant comprising a fluorophilic tail soluble in a fluorophilic (e.g., fluorocarbon) continuous phase, and a headgroup soluble in either an aqueous phase or a lipophilic (e.g., hydrocarbon)

phase. The combination of a fluorophilic tail and a headgroup may be chosen so as to create a surfactant with a suitable geometry for forming stabilized emulsion droplets having all three of fluorophilic, aqueous, and liphophilic phases in a continuous, liphophilic phase. In some cases, the surfactant is preferably non-ionic and can prevent or limit the adsorption of molecules at the interface between the surfactant and the discontinuous phase. Surfactants and surfactant combinations may provide sufficient stabilization against coalescence of droplets, without interfering with processes that can be carried out inside the droplets. An example of such a surfactant can be perfluoropolyethers sold under the brand name KRYTOX® (DuPont), including KRYTOX-FSH, KRYTOX-AS, and KRYTOX-M. Such surfactants may also comprise perfloroether and polyethyleneglycol (PEG) moieties.

The (per)fluoropolyether chain may comprise repeating units including, but not limited to, $-(C_nF_{2n}O)_x-$, where n is an integer, for example, $-(C_3F_6O)_x-$; $-(C_5F_{10}O)_x-$; $(CF(CF_3)CF_2O)_x-$, $-(CF_2CF_2O)_x-$; $-(CF(CFO-CF_xO)-$; $-CF(CF_3)CONH-$; $-(CF_2(CF_2)_zCF_2O)_x-$, where z' is an integer; $-(CFLO)_n-$, where L=—F or —$CF_x$; and $-(CH_2CF_2CF_2O)_x-$. In some cases, $(C_nF_{2n+1})_x-$, where n is an integer (for example, $-(CF_3O)_x-$, $-(C_3F_7O)_x-$, etc.), is used as a terminal group and may not be polymerizable. In some cases, the (per)fluoropolyether chain may have the structure $(C_nF_mO)_x-$, where n and m are integers properly chosen to form a valid structure. In some embodiments, the fluoropolymer comprises poly((per)fluoromethylene oxide), poly((per)fluoroethylene oxide), poly((per)fluoropropylene oxide), and/or poly((per)fluorobutylene oxide). In one particular embodiment, the fluorophilic chain includes poly((per)fluoropropylene oxide). In another embodiment, the fluorophilic chain includes a poly((per)fluoroalkylmethacrylate). Typically, x in the structures above is greater than or equal to 8. For example, x may be greater than or equal to 10, greater than or equal to 14, greater than or equal to 16, greater than or equal to 20, greater than or equal to 30, greater than or equal to 40, or greater than or equal to 50.

Non-limiting examples of other types of fluorpolymers or oligomers that can be included in the fluorophilic tail, and/or as side chains, include vinylidene fluoride (VDF), (per) fluoroolefins (e.g., tetrafluoroethylene (TFE)), chlorotrifluoroethylene (CTFE), (per)fluoroalkylvinylethers (PAVE), e.g., $CF_2=CFOR_f$, where $R_f$ is a (per)fluoroether or a $C_n$ (per)fluoroalkyl such as trifluoromethyl or pentafluoropropyl, where n is an integer; and perfluoro-oxyalkylvinylethers $CF_2=CFOR_x$, where x is a $C_{12}$ perfluoro-oxyalkyl having one or more ether groups, for example, perfluoro-2-propoxy-propyl. Other examples of monomers present within the fluorophilic component include fluorinated acrylates and fluorinated methacrylates. In some cases, the fluorophilic component may be a component where at least about 10% or at least about 20% of the atoms defining the component are fluorine atoms.

A fluorophilic component of a surfactant may have any suitable mixture of hydrogen and fluorine atoms so long as the fluorophilic component is sufficiently soluble in a suitable fluorophilic continuous phase. The solubility of a component in a fluorophilic continuous phase can be readily determined by those of ordinary skill in the art using no more than routine experimentation. For instance, a fluorophilic component may comprise monomer units such as $-(C_3F_5HO)_x-(C_3F_mH_{6-m}O)_x-$, $-(C_3F_4H_2O)_x-$, etc. In some embodiments, the fluorophilic component has a ratio of fluorine to hydrogen atoms of greater than 1:1, greater than or equal to 3:1, greater than or equal to 5:1, greater than or equal to 6:1, greater than or equal to 9:1, greater than or equal to 10:1, greater than or equal to 12:1, greater than or equal to 15:1, or greater than or equal to 20:1. In certain embodiments, the fluorophilic component is perfluorinated.

The surfactants described herein may have a hydrophilic headgroup in some cases. In some embodiments, the hydrophilic component of a surfactant is a polymer (or oligomer). The polymer may include, for example, a polyether. The polyether chain may comprise repeating units including, but not limited to, $-(C_nH_2O)_x-$, where n is an integer, for example, $-(C_3H_6O)_x-$, $-(C_4H_8O)_x-$, $-(C_5H_{10}O)_x-$; $-(C_2H_4O)_x-(C_3H_6O)_x-$, $-(C_4H_8O)_x-$, $-(C_5H_{10}O)_x-$ $(CH(CH_3)CH_2O)_x-$; $-(CH_2CH_2O)_x-$; $-(CH(CH_3)CH_2O)_x-CH(CH_3)CONH-$; $-(CH_2(CH_2)_zCH_2O)_x-$, where z' is an integer; $-(CHLO)-$, where L=—H or —$CH_3$; or $-(CH_2CH_2CH_2O)_x-$. The polyether chain may include, in some cases, terminal groups such as $(C_nH_{2n+1}O)_x-$, where n is an integer, for example, $(CH_3O)_x-$, $(C_2H_6O)_x-$, $(C_3H_7O)_x-$, etc. In some embodiments, the hydrophilic component comprises polymethylene oxide, polyethylene oxide, polybutylene oxide, and/or poly-THF, and/or various polymers thereof.

In some cases, the silicone oil comprises PDMS. In further embodiments, the PDMS has the viscosity of at least about 0.5 centistokes (cS), or at least about 1 cS, or at least about 1.5 cS, or at least about 2 cS, or at least about 3 cS, or at least about 4 cS, or at least about 5 cS, or at least about 6 cS, or at least about 7 cS, or at least about 8 cS, or at least about 9 cS, or at least about 10 cS, or at least about 20 cS, or at least about 30 cS, or at least about 40 cS, or at least about 50 cS, or at least about 60 cS, or at least about 70 cS, or at least about 90 cS, or at least about 90 cS, or at least about 100 cS. In other further embodiments, the PDMS has the viscosity of about 0.5 centistokes (cS), or about 1 cS, or about 1.5 cS, or about 2 cS, or about 3 cS, or about 4 cS, or about 5 cS, or about 6 cS, or about 7 cS, or about 8 cS, or about 9 cS, or about 10 cS, or about 20 cS, or about 30 cS, or about 40 cS, or about 50 cS, or about 60 cS, or about 70 cS, or about 90 cS, or about 90 cS, or about 100 cS.

In some cases, the polydimethylsiloxane has the mean molecular weight ($M_w$) of at least about 800 g/mol, or at least about 850 g/mol, or at least about 900 g/mol, or at least about 1000 g/mol, or at least about 1050 g/mol, or at least about 1100 g/mol, or at least about 1200 g/mol, or at least about 1250 g/mol, or at least about 1300 g/mol, or at least about 1350 g/mol, or at least about 1400 g/mol, or at least about 1450 g/mol, or at least about 1500 g/mol.

In some cases, the silicone oil comprises cyclomethicone, $(Me_2SiO)_5$, herein also referred to as cyclopentasiloxane. In further embodiments, the cyclomethicone has the viscosity of at least about 0.5 centistokes (cS), or at least about 1 cS, or at least about 1.5 cS, or at least about 2 cS, or at least about 3 cS, or at least about 4 cS, or at least about 5 cS, or at least about 6 cS, or at least about 7 cS, or at least about 8 cS, or at least about 9 cS, or at least about 10 cS, or at least about 20 cS, or at least about 30 cS, or at least about 40 cS, or at least about 50 cS, or at least about 60 cS, or at least about 70 cS, or at least about 90 cS, or at least about 90 cS, or at least about 100 cS. In other further embodiments, the cyclomethicone has the viscosity of about 0.5 centistokes (cS), or about 1 cS, or about 1.5 cS, or about 2 cS, or about 3 cS, or about 4 cS, or about 5 cS, or about 6 cS, or about 7 cS, or about 8 cS, or about 9 cS, or about 10 cS, or about 20 cS, or about 30 cS, or about 40 cS, or about 50 cS, or about 60 cS, or about 70 cS, or about 90 cS, or about 90 cS, or about 100 cS.

In some embodiments, the silicone oil comprises polydiethylsiloxane, poly(di-n-propyl) siloxane, and/or poly(di-i-propyl)siloxane. In some cases, the silicone oil is silanol-terminated. In some cases, the percentage of silanol groups per silicon atom is at least about 0.1%, or at least about 0.2%, or at least about 0.3%, or at least about 0.4%, or at least about 0.5%, or at least about 0.6%, or at least about 0.7%, or at least about 0.8%, or at least about 0.9%, or at least about 1.0%.

In some cases, the oil composition further comprises polyethylene glycol, polypropylene glycol, and/or polytetramethylether glycol.

In some cases, the fluorine-containing compound is a fluorine-substituted alkylsiloxane, such as perfluorinated or partially fluorinated polymethyldisiloxane or cyclomethicone. In some cases, the fluorine-containing compound is polymethyl-(3,3,3-trifluoropropyl)siloxane.

In some cases, the fluorine-containing compound is a perfluoroalcohol, such as perfluorinated n-hexanol, n-octanol, or n-decanol. In some cases, the fluorine-containing compound is a partially fluorinated alcohol, such as 1,1-difluorohexanol or 1,1,2,2,2,-pentafluorooctanol. In some cases, the fluorine-containing compound is solid under the trade name FLOURINERT® (3M), including, for example, FLUORINERT Electronic Liquid FC-3283, FC-40, FC-43, and FC-70. Another example is a fluorine-containing compound sold under the trade NOVEC® (3M), including NOVEC HFE 7500 engineered fluid, which is 3-ethoxy-1,1,1,2,3,4,4,5,5,6,6,6-dodecafluoro-2-trifluoromethyl-hexane. In some cases, the fluorine-containing compound is $CF_3CF_2CF_2OCH_3$, sold as NOVEC HFE 7000. In some cases, the fluorine-containing compound is 2,2,3,3,4,4,4-heptafluoro-1-butanol, $CF_3CF_2CF_2CH_2OH$.

In some cases, the fluorine-containing compound is perfluorocarbon, such as perfuorooctane or perfluorohexane. In some cases, the fluorine-containing compound is a partially fluorinated hydrocarbon, such as 1,1,1-trifluorooctane or 1,1,1,2,2-petantafluorodecane.

In some cases, the oil composition has the viscosity of at least about 0.5 cS.

In some cases, the oil composition has the density of at least about 0.5 g/ml.

In some cases, the oil composition has the buoyancy of at least about 0.01 N.

In some cases, the oil composition has the Reynolds number of at least about 0.01.

The oils described herein can be mixed for any purpose, such as to provide an oil having a desired buoyancy. For example, oils having different fluorinated and/or silicone compositions can be added to provide a droplet that has positive, negative or neutral buoyancy. The droplet can float, sink, or be neutrally buoyant in the reaction chamber.

Methods of Droplet Generation

Another aspect of this invention provides methods of droplet generation. In some cases, oil compositions combined with an aqueous phase have the form of an emulsion. The aqueous phase may include a surfactant, as described herein, such as one or more of the surfactants having a formula to embodiments of the invention may have the formulae $[R_4N][X]$ or $[R_4P][X]$. Emulsion is a composition comprising liquid droplets disposed in an immiscible liquid. The droplets are formed by at least one dispersed phase, and the immiscible liquid forms a continuous phase. The continuous phase can also or alternatively be termed a carrier and/or a carrier phase. The dispersed phase (or at least one of the dispersed phases of a multiple emulsion) is immiscible with the continuous phase, which means that the dispersed phase (the droplets) and the continuous phase (the immiscible liquid) do not mix to attain homogeneity. The droplets can have any uniform or nonuniform distribution in the continuous phase. The droplets are isolated from one another by the continuous phase and encapsulated (i.e., enclosed/surrounded) by the continuous phase. The continuous phase may be aqueous, fluorous, organic, or comprise a mixture of aqueous, fluorous, and organic components. In some cases, the continuous phase comprises water. In some cases, the continuous phase comprises silicone oil.

The droplets, which can be in the form of an emulsion, may be formed by contacting an oil composition (e.g., as described above in "Oil compositions") with an aqueous phase, thereby generating a plurality of droplets, where the droplets include the oil compositions and water. In some cases, the droplets further include a sample configured for PCR. In some cases, droplets can be generated having an average diameter of about 0.001, 0.01, 0.05, 0.1, 1, 5, 10, 20, 30, 40, 50, 60, 70, 80, 100, 120, 130, 140, 150, 160, 180, 200, 300, 400, or 500 microns.

Droplets configured for, for example, ddPCR applications may be formed when a sample to be analyzed, such as nucleic acids in an aqueous phase, is combined with a non-aqueous phase that is substantially immiscible with the aqueous phase, forming an emulsion. In such cases, the aqueous phase is likely in a dispersed phase in the form of droplets and the non-aqueous phase is the continuous phase. However, in some cases, the droplet is a double emulsion, where the aqueous core is covered by a non-aqueous layer (e.g., oil), that is surrounded by a second aqueous phase in a continuous phase. In further embodiments, the aqueous phase is in the continuous phase and the non-aqueous phase (e.g., oil or other aqueous-immiscible fluid) is in the disperse phase. For example, the nucleic acids may be in a non-aqueous fluid (e.g., oil or other aqueous-immiscible fluid) that is combined with an aqueous fluid to form droplets where the core of the droplets contains the non-aqueous phase (or disperse phase) and the where the aqueous phase is the continuous phase.

In some cases, the non-aqueous phase may include a fluorine-containing compound. The fluorine-containing compound may comprise a non-aqueous phase, which is sometimes called "fluorous phase," that is substantially immiscible with the aqueous phase. The fluorine-containing compounds may form an emulsion with the aqueous phase. In some cases, the aqueous phase is in a disperse phase in the form of droplets and the fluorous phase is in the continuous phase.

In some cases, the non-aqueous phase may include a compound that does not comprise any fluorine atoms. Such a compound can, for example, be a polydimethylsiloxane, herein also "PDMS," such as a linear polydimethylsiloxane $Me_2Si$—O—$(SiMe_2$-O$)_n$—O—$SiMe_2$, or another compound. In some cases, the non-aqueous phase may include a fluorine-containing compound and a compound that does not comprise any fluorine atoms.

In some cases, relative concentrations of fluorine-containing compounds and compounds that do not contain any fluorine atoms can be varied in real-time during droplet formation. This can be accomplished by inline fluidics which combine the fluorous and non-fluorous oils upstream of droplet generation, whereby the point at which the droplets are made contains the combined oil (hybrid), and upstream ratios can be adjusted so as to give different properties of the combined oil, such as different viscosities, buoyancy, and the like.

Figure 2:
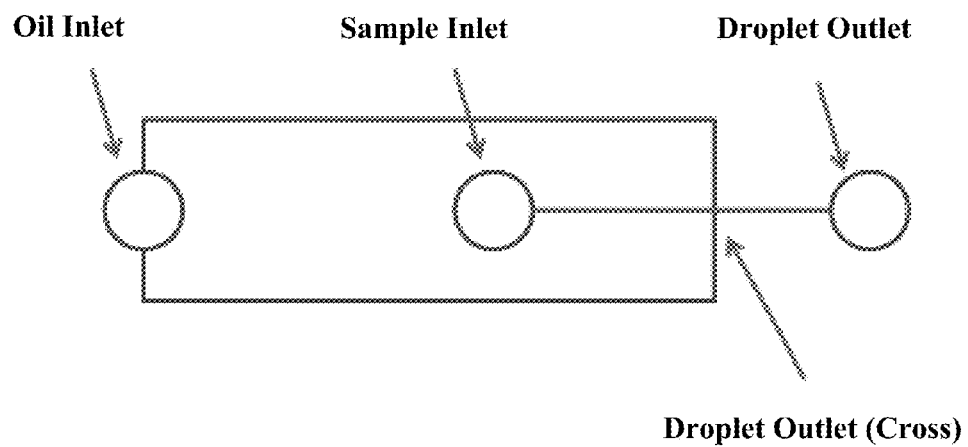
FIG. 2 schematically illustrates the droplet generation process, in accordance with an embodiment of the invention.

The process of droplet formation is illustrated schematically in FIG. 2. A sample, such as a sample containing PCR reagents and target nucleic acid, which may be an aqueous sample, enters the droplet generating device through a sample inlet and an oil, such as any of the oil compositions of the present disclosure, enters the droplet generating device through an oil inlet. The two fluids are allowed to contact one another (e.g., "cross") and a plurality of droplets is thereby generated. The droplets then exit via the droplet outlet.

In some cases, the droplets are formed with the use of a droplet generator (herein also "droplet generating device") such as a microfluidic device (e.g., a chip with fluidic channels), a device comprising fluidic capillaries, a piezo-electric actuation device, a pneumatic actuation device, a thermal bubble actuation device, a thermal buckling actuation device, acoustic wave actuation device, an electrostatic actuation device, or other generators.

In some cases, droplets can be generated by using membrane emulsification. In this process, the dispersed phase can be forced through the pores of a microporous membrane. directly into the continuous phase. Emulsified droplets are formed and detached at the end of the pores with a drop-by-drop mechanism. Membrane emulsification can lead to very fine emulsions of controlled droplet sizes and narrow, or monodisperse, droplet size distributions. Several types of membranes, e.g. ceramic, polymeric, metallic and glass, can be used.

In some cases, droplets can be generated using a microfluidic device. Microfluidic methods of producing emulsion droplets using microchannel cross-flow focusing or physical agitation are known to produce either monodisperse or polydisperse emulsions. In some embodiments, the droplets are monodisperse droplets. In some embodiments, the droplets are generated such that the size of said droplets does not vary by more than plus or minus 5% of the average size of said droplets. In some embodiments, the droplets are generated such that the size of said droplets does not vary by more than plus or minus 2% of the average size of said droplets. In some embodiments, a droplet generator can generate a population of droplets from a single sample, where none of the droplets vary in size by more than plus or minus 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% of the average size of the total population of droplets.

Some microfluidic devices and methods are based on the creation and electrical manipulation of aqueous phase droplets (e.g., droplet libraries) completely encapsulated by an inert immiscible oil stream. This combination enables precise droplet generation, highly efficient, electrically addressable, droplet coalescence, and controllable, electrically addressable single droplet sorting.

The mixtures or emulsions described herein can be stable or unstable. In preferred embodiments, the emulsions are relatively stable and have minimal coalescence. Coalescence may occur when small droplets combine to form progressively larger ones. In some embodiments, less than about 0.00001%, less than about 0.00005%, less than about 0.00010%, less than about 0.00050%, less than about 0.001%, less than about 0.005%, less than about 0.01%, less than about 0.05%, less than about 0.1%, less than about 0.5%, less than about 1%, less than about 2%. less than about 2.5%, less than about 3%, less than about 3.5%, less than about 4%, less than about 4.5%, less than about 5%, less than about 6%, less than about 7%, less than about 8%, less than about 9%, or less than about 10% of droplets generated from a droplet generator coalesce with other droplets. The emulsions can also have limited flocculation, a process by which the dispersed phase comes out of suspension in flakes. In some cases, the droplets provided herein are induced to become more stable (e.g., by application of heat). For example, the droplets can be induced to form a skin in order to stabilize the droplets. In other cases, the droplets are not subjected to heat in order to achieve greater stability. In some cases, the droplets are not induced to form a skin.

Droplets generated in microfluidic and other environments can have many applications other than nucleic acid quantification. They include protein crystallization, organic synthesis, synthesis of nanoparticles, synthesis of beads and microextraction techniques. See Huebner et al., "Microdroplets: A sea of applications?" Lab on a Chip, 2008, 8, 1244-1254, which is entirely incorporated herein by reference.

In microfluidic devices, droplets can be processed, analyzed and sorted at a highly efficient rate of several thousand droplets per second, providing a powerful platform which allows rapid screening of millions of distinct compounds, biological probes, proteins or cells either in cellular models of biological mechanisms of disease, or in biochemical, or pharmacological assays. Although major improvements in regulating droplet size and uniformity, and modifying droplet surface chemistry have been achieved, the utility of microdroplets in chemistry, biology, medicine, and ddPCR depends critically on the spatiotemporally precise delivery of microdroplets of various properties through the channels in microfluidic devices. Applications of microfluidics to DNA amplification are described in Zhang & Xing, "Single-Molecule DNA Amplification and Analysis Using Microfluidics," Chem. Rev., 2010, 110, 4910-4947, which is entirely incorporated herein by reference.

Both the flow rate in a droplet generator and the length of nucleic acids in a sample can have an impact on droplet generation. One way to decrease extension is to decrease flow rate; however, this has the undesirable side effects of lower throughput and also increased droplet size. Long nucleic acids can disrupt droplet formation, in extreme cases, resulting in a steady flow rather than discrete droplets. Reducing nucleic acid size in a sample can improve droplet formation when nucleic acid loads are high (e.g., in experiments directed toward fetal aneuploidy detection). Samples with high nucleic acid loads (e.g., high DNA loads, high RNA loads, etc.) can be used in fetal aneuploidy detection experiments because fetal nucleic acids can be rare in a maternal sample compared to the amount of maternal nucleic acids. Reducing the length of nucleic acids in the maternal sample (e.g., by digestion, heat treatment, or shearing) can improve droplet formation.

Higher mechanical stability is useful for microfluidic manipulations and higher-shear fluidic processing (e.g., in microfluidic capillaries or through 90 degree turns, such as valves, in fluidic path). Pre- and post-thermally treated droplets or capsules can be mechanically stable to standard pipette manipulations and centrifugation.

In some embodiments, the droplets can be formed by flowing an oil phase through an aqueous sample. In some embodiments, the aqueous phase comprises a buffered solution and reagents for performing a PCR reaction, can include nucleotides, primers, probe(s) for fluorescent detection, template nucleic acids, DNA polymerase enzyme, and/or reverse transcriptase enzyme.

In some cases, droplets can be generated using standard emulsion PCR techniques. Emulsion PCR is a reaction of DNA amplification in a water-in-oil emulsion. During emulsion PCR, a single DNA fragment is linked to the specific adaptor and bound to a single streptavidin-coated bead. Thereafter DNA carrying beads are suspended in a water-in-oil emulsion, so that each bead with a single DNA fragment resides in an individual emulsion droplet, and DNA fragments are amplified in the polymerase chain reaction. As a result of emulsion PCR each bead is coated with millions of copies of a single DNA fragment. Subsequently beads carrying amplified DNA are placed into fiber-optic wells where one bead resides in one well (which is determined by the size of a well), and a DNA sequence is determined through a pyrosequencing reaction. During pyrosequencing, the universal sequencing primer anneals to the DNA fragment and afterward is elongated in repeated cycles of sequential deoxyribonucleotide triphosphate (dNTP) incubations and washing with apyrase enzyme (which degrades nucleotides) between each dNTP flow. dNTP incorporation to the growing DNA strand (whenever it happens) causes the release of inorganic pyrophosphate, which is measured chemiluminescently by a charge-coupled device camera and allows the DNA sequence to be determined.

Target nucleic acids can be amplified in the droplets. Any method known in the art may be used to amplify the target nucleic acids either linearly or exponentially. One method is the polymerase chain reaction (PCR). However, any amplification technique commonly known in the art may be implemented such as rolling circle amplification, isothermal amplification, or any combination of amplification methods using loci specific primers, nested-primers, or random primers (such primers, and/or primers used for PCR, are included in the term "PCR reagents," or "amplification reagents").

The number of partitions (e.g., droplets) largely defines the dynamic range of target DNA quantification, where an order of magnitude increase in the number of replicates yields approximately an order of magnitude increase in dynamic range. Increasing the number of partitions also improves precision and therefore enables resolution of small concentration differences between nucleic acid sequences in a sample.

Target nucleic acids can be amplified in the droplets. Any method known in the art may be used to amplify the target nucleic acids either linearly or exponentially. One method is the polymerase chain reaction (PCR). However, any amplification technique commonly known in the art may be implemented such as rolling circle amplification, isothermal amplification, or any combination of amplification methods using loci specific primers, nested-primers, or random primers (such primers, and/or primers used for PCR, are included in the term "PCR reagents," or "amplification reagents").

In some cases, the plurality of droplets comprises a sample configured for polymerase chain reaction (PCR) amplification. The sample may include a quantity of nucleic acid, a polymerase such as DNA polymerase (e.g., Taq polymerase), and a ddPCR master mix. The master mix may include components such as monoclonal antibodies, deoxynucleotides, and a reaction buffer comprising an inorganic salt. A master mix may be obtained from commercial suppliers such as Novagen. In some cases, the droplets are thermally cycled so as to induce PCR. In some cases, a so-called "hot start" master mix is used. In these cases, a master mix for PCR comprises a thermostable polymerase enzyme, universal primers for template MIP amplification, free DNA nucleotides for incorporation, and buffer components for the reaction. The thermostable polymerase enzyme can retain activity when exposed to temperatures greater than 99, 98, 97, 96, 95, 94, 93, 92, 91, 90, 80, 70 degrees or less.

The master mix phase may include a surfactant, as described herein, such as one or more of the surfactants having a formula to embodiments of the invention may have the formulae $[R_4N][X]$ or $[R_4P][X]$.

In some cases, droplets containing up to at least about 1 time of the final concentration of master mix remain stable (i.e., uncoalesced) for at least about 0.5, at least about 0.6, at least about 0.8, at least about 1, at least about 1.2, at least about 1.5, at least about 2.0, at least about 3, at least about 4, at least about 5, at least about 6, at least about 7, at least about 8, at least about 9, or at least about 10 days. In some cases, droplets containing up to at least about 1 time of the final concentration of master mix remain stable (i.e., uncoalesced) for about 0.5, about 0.6, about 0.8, about 1, about 1.2, about 1.5, about 2.0, about 3, about 4, about 5, about 6, about 7, about 8, about 9, or about 10 days.

In some cases, the plurality of droplets has the viscosity of at least about 0.5 or about 1 cS.

In some cases, the plurality of droplets has the density of at least about 0.5 g/ml.

In some cases, the plurality of droplets have a thermal conductivity of at least 0.01.

In some cases, the relatively high thermal conductivity of the droplets enables the PCR amplification (further described herein) in the droplets to be conducted at a faster rate than in droplets that are less thermally conductive.

In some cases, the plurality of droplets further comprises a surfactant as described herein. The droplets comprising a surfactant may further comprise a sample configured for PCR amplification, such real-time probes.

In some cases, the detection probe is an oligonucleotide comprising a fluorophore covalently attached to the 5'-end of the oligonucleotide and a quencher at the 3'-end. Different fluorophores (e.g. 6-carboxyfluorescein (FAM), or tetrachlorofluorescin (TET)) and quenchers (e.g. tetramethylrhodamine, (TAMRA), or dihydrocyclopyrroloindole tripeptide minor groove binder (MGB)) can be used in the detection probe. The quencher molecule quenches the fluorescence emitted by the fluorophore when excited by the cycler's light source via FRET (Fluorescence Resonance Energy Transfer). As long as the fluorophore and the quencher are in proximity, quenching inhibits any fluorescence signals.

In some embodiments, the probes comprise real-time probes (e.g., TaqMan™, etc). Such real-time probes may permit the amplified targets to be detected during the amplification process. Different real-time PCR variants are familiar to persons skilled in the art, and include but are not limited to Lightcycler™, TaqMan™, Sunrise™, Molecular Beacon™ or Eclipse™ probes. The particulars on constructing and detecting these probes are known in the art (see, e.g., U.S. Pat. No. 6,331,393 with additional citations, incorporated by reference herein). The design of the probes is carried out manually, or by means of suitable software (e.g., the "PrimerExpress™" software of Applied Biosystems (for TaqMan™ probes) or via the MGB Eclipse™ design software of Epoch Biosciences (for Eclipse™ probes). In some embodiments, the real-time probes are selected from the probe group consisting of FRET probes, dual-label probe comprising a fluorescence-reporter moiety and fluorescence-quencher moiety, Lightcycler™, TaqMan™, Sunrise™, Molecular Beacon™, Eclipse™, scorpion-type primers that comprise a probe that hybridizes to a target site within the scorpion primer extension product, and combinations thereof. In some embodiments, TaqMan™ probes are used. In some embodiments, TaqMan™ probes are used in combination with Minor Groove Binders (MGB).

In some embodiments, the surfactant and/or other components of the droplets do not interfere with the activity of the polymerase (e.g., Taq polymerase), or other components, such as real time probes, of the sample configured for PCR amplification. For example, TaqMan™ assays used in combination with MGB proceeded normally.

In some cases, this disclosure provides droplets containing two phases that are stable even after manipulation by e.g., pipetting or other manual or automated handling, or after being contacted with a device such as a thermal cycler, a droplet spacing device or a droplet detector. The droplets provided herein may also maintain the integrity of the components within the droplets (e.g., PCR reagents, PCR dyes). In some cases, the oil composition comprises a dye, which remains stable (chemically inert or unreactive) within the droplets for a period of time. The dye can be a cyanine or a non-cyanine die. In some cases, the non-cyanine dye can be a pentacene, anthracene, naphthalene, ferrocene, methyl viologen, tri-morpholino ammonium, or another aromatic or heteroaromatic derivative. In some cases, the intercalating is a cyanine, merocyanine, or indocyanine. In some cases, the dye is Sybr Gold, Oxazole Yellow, Thiazone Orange, Alexa Fluor, DyiLght Fluor. In some cases, the dye is Sybr green. In some cases, the dye is an intercalating dye. The droplets may enable an intercalating dye, such as Sybr green, to retain its stability such that it continues to exhibit fluorescence even after a long period of time within the droplet. The intercalating dye remains stable (i.e., chemically inert or unreactive) when PCR conditions are applied to the droplets.

In further embodiments, the intercalating dye is stable in the droplets for at least 1, or at least 2, or at least 3, or at least 4, or at least 5, or at least 6, or at least 7, or days after droplet formation, as determined by fluorescent microscopy. In further embodiments, the intercalating dye is stable in the droplets for at least 1 day, or at least 2 days, or at least 3 days, or at least 4 days, or at least 5 days, or at least 6 days, or at least 7 days, or at least 14 days, or at least 30 days, or at least 2 months, or at least 3 months, or at least 4 months, or at least 5 months, or at least 6 months, or at least 1 year after the droplets have been subjected to heat (e.g., thermal cycling to promote amplification), as determined by fluorescent microscopy. In further embodiments, the intercalating dye is stable in the droplets for at least 1, or at least 2, or at least 3, or at least 4, or at least 5, or at least 6, or at least 7 days, or at least 14 days, or at least 30 days, or at least 2 months, or at least 3 months, or at least 4 months, or at least 5 months, or at least 6 months, or at least 1 year after the droplets have been subjected to PCR conditions (e.g., thermal cycling to promote amplification), as determined by fluorescent microscopy.

In some cases, the at least about 99% by weight of intercalating dye remains in the droplets (e.g., it does not leach out or otherwise becomes lost to the continuous phase), for at least 1, or at least 2, or at least 3, or at least 4, or at least 5, or at least 6, or at least 7 days, or at least 14 days, or at least 30 days, or at least 2 months, or at least 3 months, or at least 4 months, or at least 5 months, or at least 6 months, or at least 1 year after the droplets have been subjected to PCR conditions (e.g., thermal cycling to promote amplification), as determined by fluorescent microscopy.

In some cases, the continuous phase accumulates no more than about 0.00001 mol/L dye, such as Sybr green dye, after at least 1, or at least 2, or at least 3, or at least 4, or at least 5, or at least 6, or at least 7 days, or at least 14 days, or at least 30 days, or at least 2 months, or at least 3 months, or at least 4 months, or at least 5 months, or at least 6 months, or at least 1 year after the droplets have been subjected to PCR conditions (e.g., thermal cycling to promote amplification), as determined by fluorescent microscopy.

FIG. 4 illustrates the stability of the Sybr green intercalating dye in the droplets, in accordance with an embodiment of the invention; FIG. 4a shows a bright-field image of droplets comprising Sybr green before PCR; FIG. 4b shows a bright-field image of droplets comprising Sybr green within a day of PCR having been performed on the droplets; FIGS. 4c and 4d show florescent images of Sybr green in the droplets within a day of PCR having been performed on the droplets; FIG. 4e shows a bright-field image shows droplets comprising Sybr green 4 days after PCR has been performed on the droplets; FIG. 4f shows a fluorescent image of Sybr green in the droplets 4 days after PCR has been performed on the droplets.

Methods of Nucleic Acid Amplification

This disclosure provides methods of nucleic acid amplification, e.g., PCR. The method comprises providing an oil composition (as described herein) contacting it with an aqueous phase, where the aqueous phase comprises a sample configured for nucleic acid amplification, generating a plurality of droplets comprising the oil composition and the aqueous phase, and thermally cycling the droplets so as to induce nucleic acid amplification. In some cases, the oil composition can include one or more fluorine-containing compounds and one or more compounds that do not contain any fluorine atoms.

PCR can be carried out as an automated process with a thermostable enzyme. In this process, the temperature of the reaction mixture is cycled through a denaturing region, a primer annealing region, and an extension reaction region automatically. Machines specifically adapted for this purpose are commercially available. Although PCR amplification of a target polynucleotide sequence (e.g., that of RASSF1A, APC, CASP8, RARB, SCGB3A1, DAB2IP, PTPN6, THY1, TMEFF2, or PYCARD) can be used in practicing the methods of present disclosure, one of skill in the art will recognize that the amplification of a genomic sequence can be accomplished by any known method, such as ligase chain reaction (LCR), transcription-mediated amplification, and self-sustained sequence replication or nucleic acid sequence-based amplification (NASBA), each of which provides sufficient amplification. More recently developed branched-DNA technology can also be used to qualitatively demonstrate the presence of a particular genomic sequence, which represents a particular methylation pattern, or to quantitatively determine the amount of this particular genomic sequence in the maternal blood. For a review of branched-DNA signal amplification for direct quantification of nucleic acid sequences in clinical samples, see Nolte, Adv. Clin. Chem. 33:201-235, 1998, which is herein incorporated by reference in its entirety.

Other techniques for amplification include the methods described in U.S. Pat. No. 7,048,481, which is herein incorporated by reference in its entirety. Briefly, the techniques include methods and compositions that separate samples into small droplets, in some instances with each containing on average less than one nucleic acid molecule per droplet, amplifying the nucleic acid sequence in each droplet and detecting the presence of a particular target sequence. In some embodiments, the sequence that is amplified is present on a probe to the genomic DNA, rather than the genomic DNA itself.

As described herein, the aqueous may further comprise a DNA polymerase, master mix (including "hot-start" master mix), a target nucleic acid, and an intercalating dye. Methods of nucleic acid amplification involving droplets are described in U.S. Pat. No. 7,041,481, issued May 9, 2006; U.S. patent application Ser. No. 12/586,626, filed Sep. 23, 2009; U.S. patent application Ser. No. 12/862,542, filed Aug. 24, 2010; and U.S. patent application Ser. No. 12/976,827, filed Dec. 22, 2010, which are entirely incorporated herein by reference.

Briefly, thermocycling reactions can be performed on samples contained in droplets, such as droplets comprising an aqueous phase and any of oil compositions described herein. The droplets can remain intact during thermocycling. Droplets may remain intact during thermocycling at densities of greater than about 10,000 droplets/mL, greater than about 100,000 droplets/mL, greater than about 200,000 droplets/mL, greater than about 300,000 droplets/mL, greater than about 400,000 droplets/mL, greater than about 500,000 droplets/mL, greater than about 600,000 droplets/mL, greater than about 700,000 droplets/mL, greater than about 800,000 droplets/mL, greater than about 900,000 droplets/mL, greater than about 1,000,000 droplets/mL, greater than about 2,000,000 droplets/mL, greater than about 5,000,000 droplets/mL, greater than about 10,000,000 droplets/mL, greater than about 20,000,000 droplets/mL, greater than about 30,000,000 droplets/mL, greater than about 40,000,000 droplets/mL, greater than about 50,000,000 droplets/mL, greater than about 60,000,000 droplets/mL, greater than about 70,000,000 droplets/mL, greater than about 80,000,000 droplets/mL, greater than about 90,000,000 droplets/mL, greater than about 100,000,000 droplets/mL, greater than about 200,000,000 droplets/mL, or greater than about 300,000,000 droplets/mL. Alternatively, droplets may remain intact during thermocycling at densities of about 10,000 droplets/mL, about 100,000 droplets/mL, about 200,000 droplets/mL, about 300,000 droplets/mL, about 400,000 droplets/mL, about 500,000 droplets/mL, about 600,000 droplets/mL, about 700,000 droplets/mL, about 800,000 droplets/mL, about 900,000 droplets/mL, about 1,000,000 droplets/mL, about 2,000,000 droplets/mL, about 5,000,000 droplets/mL, about 10,000,000 droplets/mL, about 20,000,000 droplets/mL, about 30,000,000 droplets/mL, about 40,000,000 droplets/mL, about 50,000,000 droplets/mL, about 60,000,000 droplets/mL, about 70,000,000 droplets/mL, about 80,000,000 droplets/mL, about 90,000,000 droplets/mL, about 100,000,000 droplets/mL, about 200,000,000 droplets/mL, or about 300,000,000 droplets/mL. In other cases, two or more droplets may coalesce during thermocycling. In other cases, less than 0.01%, less than 0.1%, less than 0.5%, less than 1%, less than 2%, less than 3%, less than 4%, less than 5%, less than 6%, less than 7%, less than 8%, less than 9%, or less than 10% of droplets may coalesce during thermocycling. Additional methods of nucleic acid amplification are described in U.S. patent application Ser. No. 13/385,277, filed on Feb. 9, 2012, and U.S. patent application Ser. No. 13/400,300, filed Feb. 17, 2012 which are entirely incorporated herein by reference.

Spacing and Detection Systems

Another aspect of this invention provides a system comprising a plurality of droplets, where a nucleic acid in the droplets undergoes PCR amplification, a spacer fluid, a droplet transporter configured to drive flow of the droplets through a region comprising a tube equipped with at least two inlets, and a detector configured to collect data related to amplification of one or more nucleic acid targets from individual droplets as such individual droplets travel through the detection region, a controller programmed to determine, based on the data collected, whether each nucleic acid target is present or absent in individual droplets. The controller can comprise one or more computer processors with machine executable code implement any of the methods of the present disclosure. Droplet detection systems, which comprise droplet spacers, are further described in U.S. Pat. App. Nos. 201190311978 and International Pat. Pub. No. WO2011/120020, which are entirely incorporated herein by reference.

Briefly, a droplet spacer may include at least two inlet channels, an outlet channel, and a confluence region or separation region forming a junction between the inlet channels and the outlet channel. The at least two inlet channels may include a droplet inlet channel that receives an emulsion of droplets in a continuous phase, and at least one singulation channel that receives a carrier fluid, such as an oil, for diluting the droplets/emulsion. The spacer may have any suitable configuration. For example, the inlet channels and the outlet channel collectively may form a T, a cross, a coaxial arrangement, or the like.

The droplet inlet channel may have a uniform diameter or may taper toward the confluence region. If tapered, the droplet inlet channel may have a maximum diameter that is greater than that of the droplets (e.g., at least about 50%, 100%, 150%, 200%, or 300% greater in diameter, among others). The droplet inlet channel may taper to a minimum diameter (e.g., adjacent the confluence region) that is about the same or less than the diameter of the droplets. For example, the diameter of the droplet inlet channel may be between about 90% and about 100% of an average diameter of the droplets, among others. The use of a minimum diameter that is about the same or less than the diameter of the droplets may permit only one droplet to enter the confluence region at a time, thereby facilitating production of a single-file stream of droplets for a downstream detection site.

The dilution inlet channel (or channels) may have a diameter that is less than, about the same as, or greater than the maximum or minimum diameter of the droplet inlet channel. The spacer may have any suitable number of dilution channels, such as one, two, three, or more. The dilution channel(s) thus may be disposed on only side of the confluence region, on opposing sides, on three or more sides, etc. In some examples, the dilution channel may communicate with the confluence region circumferentially.

The confluence region may have any suitable structure. The confluence region may have a diameter that is greater than the minimum diameter of the droplet inlet channel and greater than the diameter of the droplets. As a result, any droplets newly-formed at the droplet spacer (such as by fragmentation of a coalesced set of droplets) should be larger than the original droplets of interest. Accordingly, any droplets detected to be larger than a threshold size by a downstream detector (and thus likely to be formed after thermal cycling) may be excluded from the analysis. The confluence region may taper toward the outlet channel, which may act to accelerate each individual droplet out of the confluence region. Furthermore, the droplet inlet channel and the droplet outlet channel may be near one another, such as separated by no more than about twice, one, or one-half the droplet diameter, to promote exit of droplets from the confluence region, thereby allowing only one droplet to be present in the confluence region at a time.

The spacer may define a minimum diameter along a flow path followed by droplets between a pick-up tip and an examination region. Accordingly, the spacer may provide a maximum resistance to fluid flow along the flow path. Fluid may be driven along the flow path at a sufficient velocity to provide a high shear, to help prevent clogs and remove particulates. The high shear also may help to increase the distance between droplets.

Figure 3:
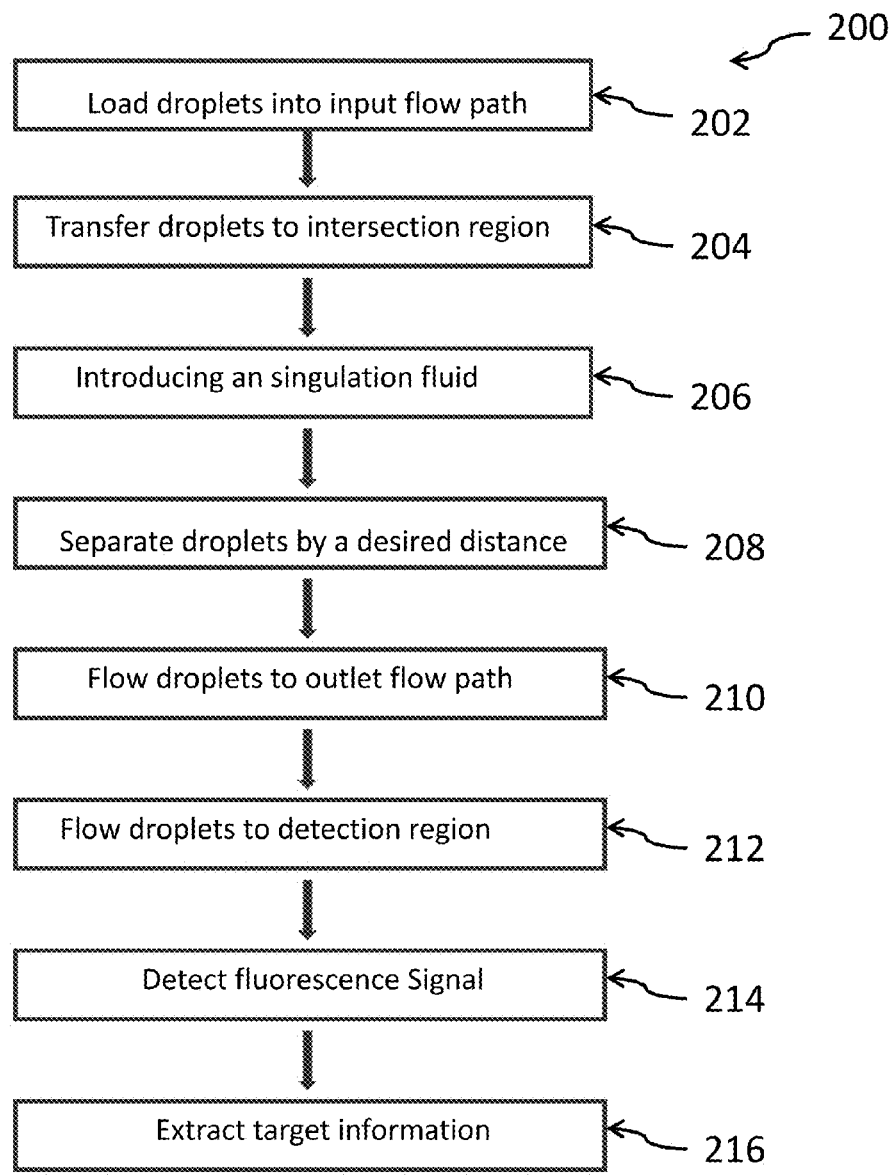
FIG. 3 schematically illustrates the droplet singulation process workflow, in accordance with an embodiment of the invention.

FIG. 3 is a flowchart depicting operations of a method of detecting or reading droplets. Although various operations of method 200 are described below and depicted in FIG. 3, the operations need not necessarily all be performed, and in some cases may be performed in a different order than the order shown in FIG. 3.

In some embodiments, droplets containing a sample (e.g., nucleic acids) are loaded into an input flow path 202. The droplets may have been heated or subjected to thermal cycling before entering the input flow path. In some cases, the droplets comprise reaction products from a polymerase chain reaction (PCR).

The sample-containing droplets may flow or be transferred to an intersection region 204, where they may be contacted with a singulation fluid 206. In some cases, the droplets and the singulation fluid are introduced to the intersection region simultaneously; in some cases, the droplets and the singulation fluid is introduced to the intersection region sequentially. After the droplets come in contact with the singulation fluid, they may form a double emulsion, where the droplets comprise an aqueous core enveloped or encapsulated by a non-aqueous fluid that is, in turn, surrounded by the singulation fluid, which can be in a continuous phase.

The flow rate of the droplets and the singulation fluid can be separately controlled. In some cases, the flow of the droplets is controlled by pressure (e.g., vacuum pressure, pump pressure). The singulation fluid may help separate droplets by a desired distance 208.

The droplets from the intersection region may flow into an output flow path 210. As a result, the space between the droplets may increase. The average distance between droplets in the output flow path may be greater than the average distance between droplets prior to entering into an intersection region. The greater separation may be due to an increase in fluid speed as fluid approaches and travels inside the output flow path 210. Further downstream of the outlet flow path is at least one detection region. After droplets flow to the detection region 212, the operation of detecting a signal 214, such as a fluorescence signal, may be carried out. The droplets may be subjected to a stimulus in order to activate the signal, such as fluorescent light or other radiation. For example, the stimulus may be chosen to stimulate emission of fluorescence from one or more fluorescent probes within the droplets. The radiation may travel through air and/or an optical fiber before reaching the droplets. Fluorescence emitted by droplets irradiated in the detection region is detected by a fluorescence detector. The fluorescence may be transferred to the fluorescence detector with or without passing through one or more intermediate optical elements such as lenses, apertures, filters, or the like. The fluorescence also may or may not be transferred to the fluorescence detector through one or more optical fibers. In batch detection applications, the detector and/or the intersection region may be configured to move in a manner that allows an optical scan of the detection region by a detector having a smaller field of view than the entire intersection region.

At operation 216, detected fluorescence is analyzed to determine whether or not a particular target nucleotide sequence is present in the droplets. Additional information, including but not limited to an estimate of the number or fraction of droplets containing a target molecule, the average concentration of target molecules in the droplets, an error margin, and/or a statistical confidence level, also may be extracted from the collected data.

One component of the droplet detection system is a singulation fluid, which may function as a spacing or spacer fluid, or focusing fluid, or dilution fluid. Singulation fluid is also described in U.S. Pat. App. Pub. No. 20110217712 which is entirely incorporated herein by reference. A spacing fluid that may be added to the emulsion, and can be miscible with the current/original continuous phase. Accordingly, the spacing fluid may be aqueous or non-aqueous, based on the type of emulsion to which the fluid is being added.

For use with a water-in-oil emulsion, the spacer fluid may include the same base oil as the continuous phase or a different base oil. (A base oil is the predominant or primary oil (or oils) in an oil (continuous) phase.) For example, the continuous phase may have a fluorinated oil as the base oil, and the spacer fluid may have the same (or a different) fluorinated oil as its base oil. In some cases, the continuous phase may include an oil that is a combination of at least one fluorine-containing compound and at least one compound that does not include any fluorine atoms, such as a fluorinated oil and a non-fluorinated silicone oil, while the spacer fluid may include only a non-fluorinated silicone oil.

In some cases, the spacer fluid includes a different surfactant than the continuous phase, and/or substantially less total surfactant by weight than the continuous phase (e.g., at least about 2-, 5-, 10-, or 100-fold less total surfactant, among others). Alternatively, or in addition, the spacing fluid may have no surfactant that is present at a concentration above the critical micelle concentration of the surfactant (which includes having at least substantially no surfactant at all). Use of a concentration of surfactant below its critical micelle concentration may minimize unwanted formation of new droplets, while providing a cleaning function in a flow system.

In some cases, the spacer fluid is a silicone oil. In some cases, the silicone oil has a viscosity of at least about 0.5 cS, or at least about 1 cS, or at least about 2 cS, or at least about 3 cS, or at least about 4 cS, or at least about 5 cS, or at least about 6 cS, or at least about 7 cS, or at least about 8 cS, or at least about 9 cS, or at least about 10 cS, or at least about 15 cS, or at least about 20 cS, or at least about 30 cS, or at least about 40 cS, or at least about 50 cS, or at least about 60 cS, or at least about 70cS, or at least about 80 cS, or at least about 90 cS, or at least about 100 cS. In some cases, the spacer fluid has the mean molecular weight ($M_w$) of at least about 800 g/mol, or at least about 850 g/mol, or at least about 900 g/mol, or at least about 1000 g/mol, or at least about 1050 g/mol, or at least about 1100 g/mol, or at least about 1200 g/mol, or at least about 1250 g/mol, or at least about 1300 g/mol, or at least about 1350 g/mol, or at least about 1400 g/mol, or at least about 1450 g/mol, or at least about 1500 g/mol. In some cases, the spacer fluid is substantially free of surfactant. That is, the spacer fluid comprises no measurable amount of surfactant. In some cases, the spacer fluid is substantially free of surfactant. That is, the spacer fluid comprises surfactant, as that which can be measured by techniques such as nuclear magnetic resonance, gas chromatography-mass spectrometry, or other analytical techniques.

In some cases, the spacer fluid is DC 200® fluid available from Dow Corning.

In some cases, the droplets enter the detection region though the droplet inlet channel and the spacer fluid enters the detection region through the singulation channel. In some cases, the droplets and the spacer fluid meet at the confluence region.

Figure 5:
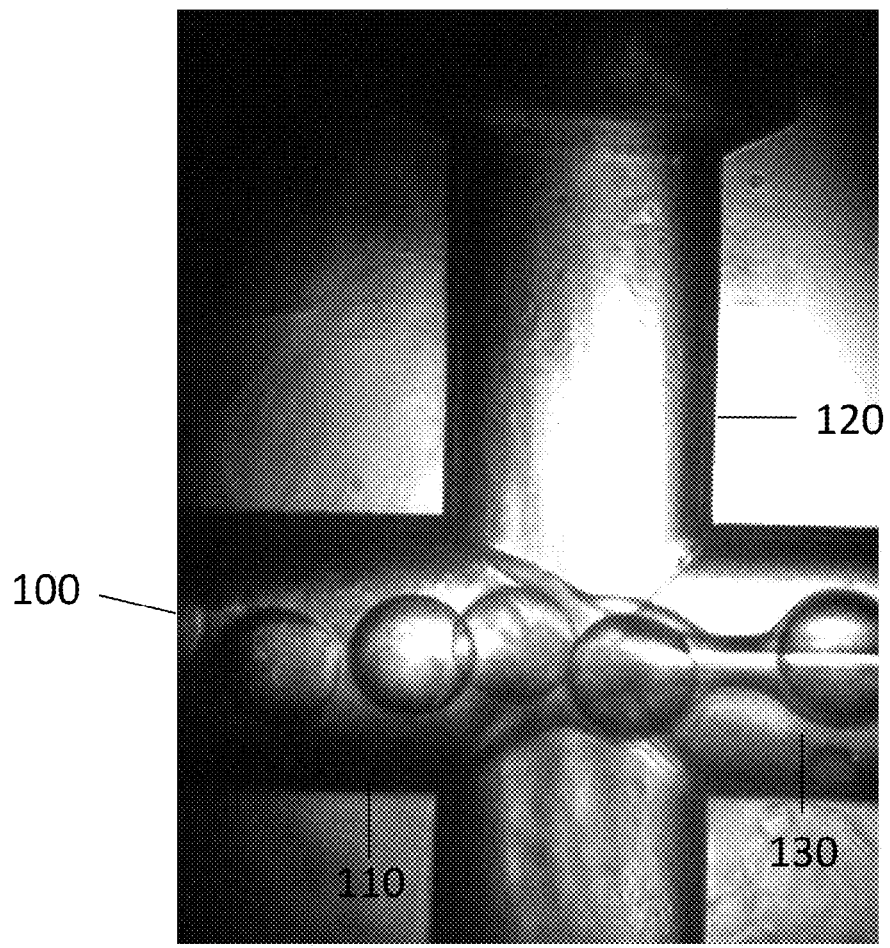
FIG. 5 illustrates focusing and encapsulation of droplets with a spacer fluid, showing the intersection of a tube carrying the droplets and an inlet carrying the spacer fluid in accordance with an embodiment of the invention.

FIG. 5 shows the intersection of the droplets coming in through the droplet inlet channel and the spacer fluid coming in through the singulation channel carrying the spacer fluid, according to an embodiment of the invention. The droplets 100, which contain nucleic acid sample that has undergone PCR amplification, are moving through the droplet inlet channel 110 from left to right in FIG. 5, and the singulation, or spacer, fluid (here, DSC 200) enters the tube through a singulation channel 120 disposed at 90° with respect to the tube (i.e., moving through the tube from top to bottom in FIG. 2). In this embodiment, the droplets move through the tube at 8 μL/min, and the spacer fluid moves through the singulation channel at 20 μL/min. The spacer fluid comes into contact with the droplets, forming encapsulated droplets 130 that are streamlined and centered in the tube, and are further directed toward the center of the detector (not shown).

FIG. 6 further illustrates the streamlining of oil compositions and droplets that comprise them by a spacer fluid, according to an embodiment of the invention. Panels in FIGS. 6a, 6b, and 6c show how an oil composition comprising a silicone oil and a fluorinated compound interacts with a spacer fluid over time. In the panel in FIG. 6a, initial contact between the oil composition and the spacer fluid occurs. In the panel in FIG. 6b, the focused "streamline" begins to form as the spacer fluid surrounds the oil composition. In the panel in FIG. 6c, the streamline is a sharp, narrow line. In the panel in FIG. 6d, droplets comprising an oil composition and water flow toward the intersection of the tube with the singulation inlet, forming a streamline when the droplets come into contact with the spacer fluid.

In some cases, difference in density between the spacer fluid and the plurality of droplets is at least about 0.01, at least about 0.02, at least about 0.05, at least about 0.1, at least about 0.2, at least about 0.3, at least about 0.4, at least about 0.5, or at least about 0.6 g/mL. In some other cases, difference in density between the spacer fluid and the plurality of droplets is at least about 0.01, at least about 0.02, at least about 0.05, at least about 0.1, at least about 0.2, at least about 0.3, at least about 0.4, at least about 0.5, or at least about 0.6 g/mL.

In some cases, difference in viscosity between the spacer fluid and the plurality of droplets is at least about 1, at least about 2, at least about 3, at least about 4, at least about 5, at least about 6, at least about, at least about 8, at least about 9, at least about 10, at least about 11, at least about 12, at least about 13, at least about 14, at least about 15, at least about 16, at least about 17, at least about 18, at least about 19, at least about 20, at least about 25, or at least about 30 cS. In some other cases, difference in viscosity between the spacer fluid and the plurality of droplets is about 1, about 2, about 3, about 4, about 5, about 6, about, about 8, about 9, about 10, about 11, about 12, about 13, about 14, about 15, about 16, about 17, about 18, about 19, about 20, about 25, or about 30 cS.

In some cases, the spacer fluid spaces the droplets such that distance between the two nearest droplets is at most about 5, at most about 10, at most about 20, at most about 50, at most about 100, at most about 200, at most about 300, at most about 400, at most about 500, at most about 600, at most about 700, at most about 800, at most about 900, at most about 1,000, at most about 2,000, at most about 5,000, at most about 10,000, at most about 50,000, or at most about 100,000 μm.

In some cases, the detector comprises a fluorescence detector.

The droplet flow rate may depend upon the inner diameter of the tubing. In some cases, the droplets flow through the tube toward the detector at a rate of at least about 1 μL/min, or at least about 2 μL/min, or at least about 3 μL/min, or at least about 4 μL/min, or at least about 5 μL/min, or at least about 6 μL/min, or at least about 7 μL/min, or at least about 8 μL/min, or at least about 9 μL/min, or at least about 10 μL/min, or at least about 11 μL/min, or at least about 12 μL/min, or at least about 13 μL/min, or at least about 14 μL/min, or at least about 15 μL/min, or at least about 16 μL/min, or at least about 17 μL/min, or at least about 18 μL/min, or at least about 19 μL/min, or at least about 20 μL/min, or at least about 30 μL/min, or at least about 40 μL/min, or at least about 50 μL/min, or at least about 60 μL/min, or at least about 70 μL/min, or at least about 80 μL/min, or at least about 90 μL/min, or at least about 100 μL/min, or at least about 110 μL/min, or at least about 120 μL/min, or at least about 130 μL/min, or at least about 140 μL/min, or at least about 150 μL/min in a tubing with an inner diameter in a range of 50 to 300 microns. In some other cases, the droplets flow through the tube toward the detector at a rate of about 1 μL/min, or about 2 μL/min, or about 3 μL/min, or about 4 μL/min, or about 5 μL/min, or about 6 μL/min, or about 7 μL/min, or about 8 μL/min, or about 9 μL/min, or about 10 μL/min, or about 11 μL/min, or about 12 μL/min, or about 13 μL/min, or about 14 μL/min, or about 15 μL/min, or about 16 μL/min, or about 17 μL/min, or about 18 μL/min, or about 19 μL/min, or about 20 μL/min, or about 30 μL/min, or about 40 μL/min, or about 50 μL/min, or about 60 μL/min, or about 70 μL/min, or about 80 μL/min, or about 90 μL/min, or about 100 μL/min, or about 110 μL/min, or about 120 μL/min, or about 130 μL/min, or about 140 μL/min, or about 150 μL/min in a tubing with an inner diameter in a range of 50 to 300 microns.

In some cases, the spacer fluid enters the tube through the singulation inlet. In some cases, the inlet is disposed at an angle of at least about 40°, or at least about 45°, or at least about 50°, or at least about 55°, or at least about 60°, or at least about 65°, or at least about 70°, or at least about 75°, or at least about 80°, or at least about 85°, or at least about 90°, or at least about 95°, or at least about 100°, or at least about 105°, or at least about 110°, or at least about 115°, or at least about 120° with respect to the tube, which may be carrying the droplets.

In some cases, the droplets flow through the inlet toward the tube, which may be carrying the droplets, at the rate of at least about 10 μL/min, or at least about 15 μL/min, or at least about 20 μL/min, or at least about 30 μL/min, or at least about 40 μL/min, or at least about 50 μL/min, or at least about 60 μL/min, or at least about 70 μL/min, or at least about 80 μL/min, or at least about 90 μL/min, or at least about 100 μL/min, or at least about 110 μL/min, or at least about 120 μL/min, or at least about 130 μL/min, or at least about 140 μL/min, or at least about 150 μL/min in a tubing with an inner diameter in a range of 50 to 300 microns.

In some cases, after coming into contact with the spacer fluid, the individual droplets remain uncoalesced for at least about 30 minutes, 60 minutes, 90 minutes, 120 minutes, 150 minutes, 180 minutes, 240 minutes, 300 minutes, 360 minutes, 420 minutes, 480 minutes, 540 minutes, 600 minutes, 1 day, 2 days, 3 days, 4 days, 5 days, 6 days, 7 days, 8 days, 9 days, 10 days, 11 days, 12 days, 13 days or 14 days when held at the normal operating temperature, such as room temperature, of the detector.

In some cases, the spacer fluid directs the droplets toward the center of the detector, which is further described in "High-Throughput Droplet Digital PCR System for Absolute Quantitation of DNA Copy Number," Analytical Chemistry 2011, 83, 8604-8610 which is entirely incorporated herein by reference. In some cases, the droplets are encapsulated (i.e., enclosed/surrounded), by the spacer fluid. The concept and importance of having encapsulated droplets is discussed further in U.S. Pat. App. Pub. No. 20110217712 which is entirely incorporated herein by reference; for example, encapsulation can aid in preventing undesirable droplet coalescence and thereby provide more accurate detection. In further embodiments, the flow of the drops is streamlined, meaning that the droplets deviate minimally from a straight flow path.

Figure 7:
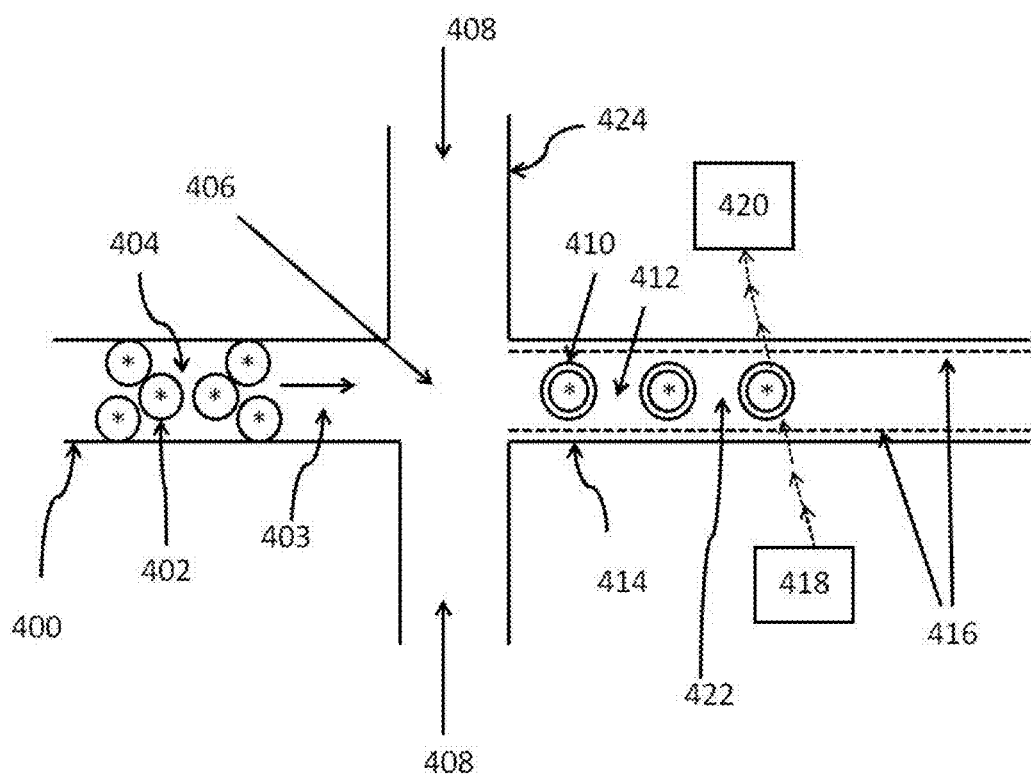
FIG. 7 schematically illustrates an exemplary droplet spacing and/or focusing device that may be used in conjunction with a droplet detector/reader, in accordance with an embodiment of the invention.

FIG. 7 is a schematic view of an exemplary droplet spacing and/or focusing device that may be used in conjunction with a droplet detector/reader. The system includes a droplet inlet channel 400, an intersection or confluence region 406, a singulation channel 424, an output flow path 414, a radiation source 418, a detector 420, and a detection region 422. Emulsified droplets 402 in a first continuous phase 403 enter the detection system through the droplet inlet channel 400. The emulsified droplets may be aqueous droplets (disperse phase) with a non-aqueous (e.g., oil, such as a combination of a fluorine-containing compound and a compound that does not contain any fluorine atoms) continuous phase 403.

Downstream of the flow path is at least one confluence region 406. The confluence region 406 may be an intersection a droplet inlet channel 400 and singulation channel 424. Upon reaching the intersection region 406, the droplets may encounter a spacer fluid 408 (e.g., a silicone oil). Spacer fluid 408 may envelop or encapsulate the emulsified droplets to form encapsulated droplets 410. The droplets may travel through a second continuous phase 412. The encapsulation may increase the stability of the droplets compared to the droplets in the input flow path 400.

The use of a spacer fluid singulation channel 408 may create a virtual capillary, represented by 416. In some cases, the virtual capillary may be composed substantially of a first continuous phase 403, which may be aqueous, and the fluid that flows through the virtual capillary tube may be substantially composed a spacer fluid 408, such as a silicone oil. In some cases, however, the virtual capillary comprises a non-aqueous fluid, such as a combination of a fluorine-containing compound and compound that does not contain any fluorine atoms, and the fluid that flows through the virtual capillary tube is an aqueous fluid.

The formation of the virtual capillary may effectively reduce the inner diameter of the output flow path 414, which can lead to an increased flow rate of droplets and fluid in the output flow path 414. The virtual capillary may enable better separation between droplets. In other words, the average distance of droplets in the output flow path may be greater than the average distance of droplets in the input flow path. In some cases, the average distance of droplets in the output flow path may be at least 2 times, or at least 5 times, or at least 10 times, or at least 15 times, or at least 25 times, more of the average distance of droplets in the input flow path. Furthermore, the virtual capillary will accommodate droplets of varying sizes, therefore, avoiding the need of changing output flow path based on the size of incoming droplets. The virtual capillary 416 may also help center or focus the droplets (410). In some cases, the virtual capillary reduced contact between the droplets and the inner surface of the output flow path. In some cases, the virtual capillary prevents the droplets from contacting the inner surface of the output flow path.

In some embodiments, this disclosure provides devices that contain a detection region for detecting, analyzing, or otherwise evaluating the droplets. The detection region may be part of the same device as the droplet spacing region and/or the droplet centering/focusing region. However, in some cases, the detection region is present in a separate device. In some cases, the separate device is connected to the output flowpath by a connector (e.g., tube, capillary, channel, etc.).

When the droplets reach the detection region 422, the droplets may be contacted with an excitation radiation (e.g., light) from a radiation source 418, which may include at least one wavelength chosen to excite the fluorescent probe(s) known to be present in the reagents within the droplets. The radiation source 418 may be a laser, a LED, or any other suitable radiation source. The fluorescence scattered from the droplets in the detection region 422 may be detected by a detector 420. The radiation may be transferred to the detection region 422 through free space or through one or more optical fibers. Furthermore, the radiation may be focused, diverged, split, filtered, and/or otherwise processed before reaching the detection region 422.

Combinations of Oil Compositions and Singulation (or Spacer) Fluids

Another aspect of this invention provides a composition for use in nucleic acid detection. The composition includes a mixture comprising a first silicone oil, a fluorine-containing compound, and water. The composition also includes a second silicone oil, such the difference in density between the mixture and the second silicone oil is at least about 0.01, at least about 0.02, at least about 0.05, at least about 0.1, at least about 0.2, at least about 0.3 g/mL, at least about 0.4 g/mL, at least about 0.5 g/mL, or at least about 0.6 g/mL. In some cases, the difference in density between the mixture and the second silicone oil is about 0.01, about 0.02, about 0.05, about 0.1, about 0.2, about 0.3 g/mL, about 0.4 g/mL, about 0.5 g/mL, or about 0.6 g/mL.

Still another aspect of this invention provides a composition for use in nucleic acid detection. The composition includes a mixture comprising a first silicone oil, a fluorine-containing compound, and water. The composition also includes a second silicone oil, such that the difference in viscosity between the mixture and the second silicone oil is at least about 0.1, at least about 0.2, at least about 0.3, at least about 0.4, at least about 0.5, at least about 0.6, at least about 0.7, at least about 0.8, at least about 0.9, or at least about 1.0 cS. In some cases, the difference in viscosity between the mixture and the second silicone oil is about 0.1, about 0.2, about 0.3, about 0.4, about 0.5, about 0.6, about 0.7, about 0.8, about 0.9, or about 1.0 cS.

In some cases, the composition comprises at least about 50%, or at least about 55%, or at least about 60%, or at least about 65%, or at least about 70%, or at least about 75%, or at least about 80%, or at least about 85%, or at least about 90%, or at least about 95%, or at least about 96% or at least about 97% or at least about 98% or at least about 99% silicone oil by weight. In some cases, the composition comprises at most about 50%, or at most about 45%, or at most about 40%, or at most about 35%, or at most about 30%, or at most about 25%, or at most about 20%, or at most about 15%, or at most about 10%, or at most about 5%, or at most about 4%, or at most about 3%, or at most about 2%, or at most about 1% fluorine-containing compound by weight.

In some cases, the second silicone oil has the viscosity of at least about 0.5 cS, or at least about 1 cS, or at least about 2 cS, or at least about 3 cS, or at least about 4 cS, or at least about 5cS, or at least about 6 cS, or at least about 7 cS, or at least about 8 cS, or at least about 9 S, or at least about 10 cS, or at least about 20 cS, or at least about 30 cS, or at least about 40 cS, or at least about 50 cS, or at least about 60 cS, or at least about 70 cS, or at least about 80 cS, or at least about 90 cS, or at least about 100 cS. In some other cases, the second silicone oil has the viscosity of less than about 0.5 cS, or less than about 1 cS, or less than about 2 cS, or less than about 3 cS, or less than about 4 cS, or less than about 5cS, or less than about 6 cS, or less than about 7 cS, or less than about 8 cS, or less than about 9 S, or less than about 10 cS, or less than about 20 cS, or less than about 30 cS, or less than about 40 cS, or less than about 50 cS, or less than about 60 cS, or less than about 70 cS, or less than about 80 cS, or less than about 90 cS, or less than about 100 cS. In some other cases, the second silicone oil has the viscosity of about 0.5 cS, or about 1 cS, or about 2 cS, or about 3 cS, or about 4 cS, or about 5cS, or about 6 cS, or about 7 cS, or about 8 cS, or about 9 S, or about 10 cS, or about 20 cS, or about 30 cS, or about 40 cS, or about 50 cS, or about 60 cS, or about 70 cS, or about 80 cS, or about 90 cS, or about 100 cS.

In some cases, the second silicone oil has the mean molecular weight ($M_w$) of at least about 800 g/mol, or at least about 850 g/mol, or at least about 900 g/mol, or at least about 1000 g/mol, or at least about 1050 g/mol, or at least about 1100 g/mol, or at least about 1200 g/mol, or at least about 1250 g/mol, or at least about 1300 g/mol, or at least about 1350 g/mol, or at least about 1400 g/mol, or at least about 1450 g/mol, or at least about 1500 g/mol.

In some cases, the second silicone oil is substantially free of surfactant. That is, the second silicone oil comprises no measurable amount of surfactant, as that which can be measured by techniques such as nuclear magnetic resonance, gas chromatography-mass spectrometry, or other analytical techniques.

In some cases, the second silicone oil is DC 200 fluid available from Dow Corning®.

In some cases, the water comprises a sample configured for PCR amplification. The sample may include components such as master mix, Taq polymerase, and a quantity of nucleic acid.

Applications

Methods and compositions of the present disclosure can be used in a large variety of applications. In some embodiments, the subject methods and compositions are used in order to monitor cellular growth rates. An increase in quantity and/or concentration of polynucleotide (e.g., DNA, RNA, mitochondrial DNA, etc.) over time can be detected using the subject methods and compositions. Such an increase can indicate that the cellular population (eukaryotic cells, microbial cells, prokaryotic cells, etc.) is growing. Plotting the increase in quantity or concentration of polynucleotides can enable calculation of the rate of growth. Such growth rate studies can be used to monitor the growth of cells growing in culture, or the progress of an infection in a subject. Such growth rate studies can also be used to measure microbial antibiotic susceptibility and resistance. An in vitro sample of microbes (e.g., bacteria) can be treated with an antibiotic of interest; then the growth rate of the microbes is monitored in order to determine the effect, if any, the antibiotic of interest has on the growth rate of the microbes of interest.

Such studies can be performed using high-throughput assays known in the art in order to identify drug candidates as well. For example, a panel of drugs (or test agent) is screened in order to identify a drug of interest that stop or reduces the growth rate of cells (e.g., bacteria, microbes, etc.). In some embodiments, a panel of drugs (or test agents) is screened in order to identify a drug of interest that increases the growth rate of cells, e.g., an effort to identify a compound that promotes healthy gastrointestinal flora. In some embodiments, a panel of drugs (or test agents) is screened against cells (e.g., mammalian cells) infected with a virus (or other microbe), in order to identify a drug or test agent that can suppress a viral infection (or other microbial infection). In such viral studies (or microbial studies), a viral polynucleotide (e.g., DNA, RNA, mitochondrial DNA, etc.) (or microbial polynucleotide) is monitored over time in order to determine the growth rate of the virus, or the rate of infection. In yet another example, a panel of drugs can be screened against a specific cell-type (e.g., a cancerous mammalian cell), and then the rate of growth of the cancerous cell can be monitored by detecting cellular polynucleotides over time using the present methods and compositions. In yet another example, a panel of drugs or test agents can be screened against a specific cell-type (e.g., a mammalian cell, mammalian hepatocyte), and then cellular viability can be monitored over time by detecting cellular polynucleotides using the present methods and compositions. In such a manner, drugs or test agents that cause cellular toxicity can be identified. In yet other embodiments, effects on cell growth are measured while altering drug dosages, chemical concentrations and environmental conditions (e.g., temperature and atmosphere) over time.

The subject methods and compositions can also be used to identify microbial susceptibility and/or resistance to a specific drug (e.g., antibiotic). Microbes (e.g., clinical isolates) can be cultured and then treated with a specific drug (e.g., antibiotic). Following treatment, the growth rate of the microbes can be monitored in order to determine whether the microbe is susceptible or resistant to the specific drug. In some embodiments, one sample is taken prior to treatment and one sample is taken following treatment of the sample with the antibiotic or other drug. In other embodiments, one sample is taken prior to treatment and then multiple samples are taken following treatment of the sample with the antibiotic or other drug.

Moreover, droplets generated in microfluidic and other environments can have many applications other than nucleic acid quantification. They include protein crystallization, organic synthesis, synthesis of nanoparticles, synthesis of beads and microextraction techniques. See Huebner et al., "Microdroplets: A sea of applications?" Lab on a Chip, 2008, 8, 1244-1254 which is entirely incorporated herein by reference.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of embodiments of the invention herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A composition comprising:
   aqueous droplets; and
   a homogeneous oil mixture forming a continuous phase that encapsulates each of the aqueous droplets, the oil mixture including (a) a silicone oil and (b) a fluorinated oil;
   wherein the concentration of said silicone oil in the oil mixture is at least about 50% by weight, and
   wherein the aqueous droplets have a neutral buoyancy in the oil mixture.

2. The composition of claim 1, wherein each of the aqueous droplets contains amplification reagents to amplify a nucleic acid target that is present in only a subset of the aqueous droplets.

3. A composition comprising:
   aqueous droplets;
   a homogeneous oil mixture including (a) a silicone oil and (b) a fluorinated oil, wherein the concentration of said silicone oil in the oil mixture is at least about 50% by weight; and
   a continuous oil phase encapsulating a dispersed first portion of the oil mixture and contacting but not encapsulating a continuous second portion of the oil mixture;
   wherein each of the dispersed first portion and the continuous second portion of the oil mixture encapsulates a plurality of the aqueous droplets.

4. The composition of claim 3, wherein the continuous oil phase includes a silicone oil.

5. The composition of claim 1, wherein the silicone oil comprises a polydimethylsiloxane.

6. The composition of claim 5, wherein the oil mixture has a viscosity of at least about 1 centistoke (cS).

7. The composition of claim 5, wherein the polydimethylsiloxane has a mean molecular weight ($M_w$) of at least about 1,000 g/mol.

8. The composition of claim 1, wherein the silicone oil comprises cyclopentasiloxane or octamethyltrisiloxane.

9. The composition of claim 1, wherein the oil mixture further includes polyethylene glycol.

10. The composition of claim 1, wherein the fluorinated oil is a fluorine-substituted alkylsiloxane.

11. The composition of claim 10, wherein the fluorinated oil is polymethyl-(3,3,3-trifluoropropyl)siloxane.

12. The composition of claim 1, wherein the homogeneous oil mixture includes a fluoroalcohol.

13. The composition of claim 1, wherein the fluorinated oil is a fluorocarbon.

14. The composition of claim 1, wherein the oil mixture includes at least about 65% silicone oil by weight.

15. The composition of claim 1, wherein the oil mixture includes at most about 30% fluorinated oil by weight.

16. The composition of claim 1, wherein the oil mixture further includes a surfactant.

17. The composition of claim 16, wherein the surfactant is a fluorine-containing compound.

18. The composition of claim 1, wherein only a subset of the aqueous droplets contain a nucleic acid target.

19. The composition of claim 18, wherein the aqueous droplets contain amplification reagents to amplify the nucleic acid target.

* * * * *